United States Patent
Fujimoto

(10) Patent No.: US 6,463,045 B1
(45) Date of Patent: Oct. 8, 2002

(54) MOBILE COMMUNICATION CAPABLE OF AVOIDING CONGESTION OF CALL PROCESSING

(75) Inventor: Koji Fujimoto, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/394,512

(22) Filed: Sep. 13, 1999

(30) Foreign Application Priority Data

Sep. 11, 1998 (JP) .......................................... 10-258775

(51) Int. Cl.[7] .......................... H04Q 7/28; H04Q 7/00; H04Q 12/12
(52) U.S. Cl. ..................... 370/331; 370/340; 370/395.2
(58) Field of Search ................................ 370/328, 338, 370/397, 399, 310, 331, 310.1, 310.2, 395.2, 340–347

(56) References Cited

U.S. PATENT DOCUMENTS

| | | | | |
|---|---|---|---|---|
| 5,365,512 A | * | 11/1994 | Combs et al. ............... | 370/341 |
| 5,889,770 A | * | 3/1999 | Jokiaho et al. .............. | 370/337 |
| 5,936,949 A | * | 8/1999 | Pasternak et al. ........... | 370/328 |
| 5,953,331 A | * | 9/1999 | Duncan et al. .............. | 370/352 |
| 6,115,610 A | * | 9/2000 | Goetz et al. ................. | 455/450 |
| 6,154,450 A | * | 11/2000 | Wallentin et al. ........... | 370/311 |
| 6,236,854 B1 | * | 5/2001 | Bradshaw .................... | 455/416 |
| 6,353,621 B1 | * | 3/2002 | Boland et al. ............... | 370/467 |

FOREIGN PATENT DOCUMENTS

| | | |
|---|---|---|
| EP | 0 544 464 | 6/1993 |
| EP | 0 577 959 | 1/1994 |
| EP | 0 708 572 | 4/1996 |
| WO | 94/28645 | 12/1994 |
| WO | 98/36612 | 8/1998 |

* cited by examiner

*Primary Examiner*—Melvin Marcelo
*Assistant Examiner*—Ron Abelson
(74) *Attorney, Agent, or Firm*—Foley & Lardner

(57) ABSTRACT

In a mobile communication system comprising a mobile station (20), a plurality of base stations (30-1 to 30-4), and an exchange station (40) connected to the base stations, a particular base station (30-1) informs, on reception of an outgoing call for the mobile station (20), the mobile station (20) of a node number for identifying the exchange station (40) and a processor number for identifying a call processing processor in the exchange station to make the mobile station (20) hold the node number and the processor number as a held node number and a held processor number. When the mobile station (20) carries out handover, the mobile station (20) sends the held node number and the held processor number to a new base station (30-2) destined for the handover. The exchange station (40) selects a call processing processor in accordance with load distribution order to make the call processing processor inherit a call processing.

62 Claims, 13 Drawing Sheets

| CONNECTION NUMBER | OBJECTIVE NODE | PORT NUMBER | VPi | VCi | DIRECTION | PORT NUMBER | VPi | VCi | OBJECTIVE NODE |
|---|---|---|---|---|---|---|---|---|---|
| 0 | BTS1 | 4 | 0 | 5 | BI | 0 | 0 | 200 | OMP |
| 1 | BTS2 | 5 | 0 | 5 | BI | 0 | 0 | 201 | OMP |
| 2 | BTS3 | 6 | 0 | 5 | BI | 0 | 0 | 202 | OMP |
| 3 | BTS4 | 7 | 0 | 5 | BI | 0 | 0 | 203 | OMP |
| 4 | BTS1 | 4 | 0 | 100 | BI | 1 | 0 | 200 | CLP0 |
| 5 | BTS2 | 5 | 0 | 100 | BI | 1 | 0 | 201 | CLP0 |
| 6 | BTS3 | 6 | 0 | 100 | BI | 1 | 0 | 202 | CLP0 |
| 7 | BTS4 | 7 | 0 | 100 | BI | 1 | 0 | 203 | CLP0 |
| 8 | BTS1 | 4 | 0 | 101 | BI | 2 | 0 | 200 | CLP1 |
| 9 | BTS2 | 5 | 0 | 101 | BI | 2 | 0 | 201 | CLP1 |
| 10 | BTS3 | 6 | 0 | 101 | BI | 2 | 0 | 202 | CLP1 |
| 11 | BTS4 | 7 | 0 | 101 | BI | 2 | 0 | 203 | CLP1 |
| 12 | ANOTHER NODE | 9 | 0 | 5 | BI | 3 | 0 | 200 | CSP |
| 13 | BTS1 | 4 | 0 | 400 | BI | 9 | 0 | 400 | ANOTHER NODE |
| 14 | BTS1 | 4 | 0 | 401 | BI | 9 | 0 | 401 | ANOTHER NODE |
| ~ | | | | | | | | | |
| 112 | BTS1 | 4 | 0 | 499 | BI | 9 | 0 | 499 | ANOTHER NODE |
| 113 | BTS2 | 5 | 0 | 400 | BI | 9 | 1 | 400 | ANOTHER NODE |
| ~ | | | | | | | | | |
| 212 | BTS2 | 5 | 0 | 499 | BI | 9 | 1 | 499 | ANOTHER NODE |
| 213 | BTS3 | 6 | 0 | 400 | BI | 9 | 2 | 400 | ANOTHER NODE |
| ~ | | | | | | | | | |
| 312 | BTS3 | 6 | 0 | 499 | BI | 9 | 2 | 499 | ANOTHER NODE |
| 313 | BTS4 | 7 | 0 | 400 | BI | 9 | 3 | 400 | ANOTHER NODE |
| ~ | | | | | | | | | |
| 412 | BTS4 | 7 | 0 | 499 | BI | 9 | 3 | 499 | ANOTHER NODE |

FIG.6

MOBILE COMMUNICATION CAPABLE OF AVOIDING CONGESTION OF CALL PROCESSING

BACKGROUND OF THE INVENTION

This invention relates to a mobile communication method and a mobile communication system in which technique of an asynchronous transfer mode (ATM) multiplexing is applied or used to a transmission between a base station and an exchange station or a base station control apparatus.

In prior art, technique of a synchronous transfer mode (STM) multiplexing is used as a transmission path interface between a base station and a mobile communication exchange station. In the manner well known in the art, the STM multiplexing is one of a time division multiplexing (TDM) system and is a system which periodically distributes time-divided channels into which an original channel is temporality divided. The STM multiplexing has a frame structure in which each frame is divided into a plurality of time slots. There is, as the transmission path interface in the STM multiplexing, a 1.5 Mbit/s highway interface or a 2 Mbit/s highway interface. The 1.5 Mbit/s highway interface has a frame structure in which each frame is divided into twenty-four time slots while the 2 Mbit/s highway interface has a frame structure in which each frame is divided into thirty-two time slots. In the 1.5 Mbit/s or 2 Mbit/s highway interface, one time slot in each frame is exclusively assigned for control of the base station. Alternatively, two time slots in each frame may be exclusively assigned for control of the base station for redundancy structure.

In addition, in prior art, the mobile communication exchange station is provided with a plurality of base station control signal terminating equipments which are fixedly connected to host call processing processors in one-to-one correspondence fashion. In addition, the base stations are connected to the base station control signal terminating equipments in one-to-one correspondence fashion. Accordingly, connection between a base station and a call processing processor has a structure of one-to-one connection fashion.

As a result, if subscribers concentrate to a particular area to which a group of base stations belongs, congestion between the base station control signal terminating equipment and the call processing processor may occur. It will be assumed that there is a plurality of control links between the base station and the base station control signal terminating equipment. In this event, the number of time slots for user traffic in each frame decreases and it results in degrading a transmission efficiency of the user traffic between the base station and the mobile communication exchange station.

Various mobile communication systems of the type are already known. By way of example, a mobile communication system is disclosed in Japanese Unexamined Patent Publication of Tokkai No. Hei 10-42,337 or JP-A 10-042337. The mobile communication system according to JP-A 10-042337 is a mobile communication system which performs ATM transmission of data transfer between a base station and a mobile communication exchange station. According to JP-A 10-042337, it is possible for the mobile communication system to execute site diversity to a mobile station during soft handover and to execute selective synthesis of received signals in low delay in the mobile communication exchange station. Transmitted from base stations to a mobile communication exchange station in layered cells, received data are received in ATM cell receiving arrangements and thereafter decomposed into short cells in short cell converting arrangements. After a short cell header is converted into a mobile station identifying ID in a UCI interpreting arrangement, a distributing arrangement distributes short cells including received data from a mobile station during soft handover. After a frame sorting arrangement obtains short cells including received data of every user, the short cells are supplied to frame selecting arrangements to select the received data having larger likelihood. However, the mobile communication system disclosed in JP-A 10-042337 does not take congestion of call processing and transmission efficiency between the base station and the mobile communication exchange station into consideration.

Another mobile communication system is disclosed in Japanese Unexamined Patent Publication of Tokkai No. Hei 9-322,235 or JP-A 09-322235. According to JP-A 09-322235, it is possible to provide a mobile communication system in which the transmission efficiency of an ATM link in the system is enhanced. The mobile communication system according to JP-A 09-322235 is composed of a portable set (PS), base stations (BSs), and a mobile exchange center (MSC). In the mobile communication system, site diversity every frame is carried out by using ATM links between the base stations and the mobile exchange center. In this event, the base station is provided with a frame transfer discrimination arrangement for discriminating whether a frame received from the portable set is aborted or is transferred to the mobile exchange center based on reliability information and with a threshold storage arrangement for storing a threshold used for discrimination of the frame transfer discrimination arrangement. As a result, a frame with low reliability is aborted by the base station and it is therefore possible to make the transmission between the base stations and the mobile exchange center efficient. However, the mobile communication system disclosed in JP-A 09-322235 does not take congestion of call processing and overhead of a call processing processor in an exchange station or in a base station control apparatus into consideration.

SUMMARY OF THE INVENTION

It is therefore an object of this invention to provide a mobile communication method and a mobile communication system, which are capable of avoiding congestion of call processing.

It is another object of this invention to provide a mobile communication method and a mobile communication system of the type described, which are capable of improving transmission efficiency.

It is still another object of this invention to provide, which is capable of provide a mobile communication method and a mobile communication system of the type described, which are capable of eliminating much of overhead of a call processing processor in an exchange station or in a base station control apparatus.

Other objects of this invention will become clear as the description proceeds.

According to a first aspect of this invention, a mobile communication method is for use in a mobile communication system for carrying out transmission between a plurality of base stations and an exchange station using an asynchronous transfer mode (ATM). The exchange station includes N call processing processors where N represents a positive integer which is not less than two. The mobile communication method comprises the steps of establishing N call processing virtual connection links between each of the stations and the exchange station, and of controlling, in response to outgoing calls successively generated by said base stations, the call processing by the N call processing processors in order by changing the N call processing virtual connection links in order.

According to a second aspect of this invention, a mobile communication method is for use in a mobile communication system for carrying out transmission between a plurality of base stations and a base station control apparatus using an asynchronous transfer mode (ATM). The base station control apparatus includes N call processing processors where N represents a positive integer which is not less than two. The mobile communication method comprises the steps of establishing N call processing virtual connection links between each of the base stations and the exchange station, and of controlling, in response to outgoing calls successively generated by the base stations, the call processing by the N call processing processors in order by changing the N call processing virtual connection links in order.

According to a third aspect of this invention, a mobile communication method is for use in a mobile communication system comprising a mobile station, a plurality of base stations, and an exchange station connected to the base stations. The exchange station comprises N call processing processors where N represents a positive integer which is not less than two. The mobile communication method comprises the steps of informing, on reception of an outgoing call for the mobile station, the mobile station of an node number for identifying the exchange station actually connected to the mobile station via a particular base station and a processor number for identifying the call processing processor actually carrying out a call processing to make the mobile station hold the node number and the processor number as a held node number and a held processor number, of sending, when the mobile station carries out handover, the held node number and the held processor number from the mobile station to a new base station destined for the handover, and of selecting, in the exchange station managing the new base station, a call processing processor in accordance with load distribution order to make the call processing processor inherit a call processing.

According to a fourth aspect of this invention, a mobile communication method is for use in a mobile communication system comprising a mobile station, a plurality of base stations, a base station control apparatus for controlling the base stations, and an exchange station connected to the base station control apparatus. The base station control apparatus comprises N call processing processors where N represents a positive integer which is not less than two. The mobile communication method comprises the steps of informing, on reception of an outgoing call for the mobile station, the mobile station of a node number for identifying said base station control apparatus actually connected to the mobile station via a particular base station and a processor number for identifying the call processing processor actually carrying out a call processing to make the mobile station hold the node number and the processor number as a held node number and a held processor number, of sending, when the mobile station carries out handover, the held node number and the held processor number from the mobile station to a new base station destined for the handover, and of selecting, in the base station control apparatus managing the new base station, a call processing processor in accordance with load distribution order to make the call processing processor inherit a call processing.

According to a fifth aspect of this invention, a mobile communication system is for carrying out transmission between a plurality of base stations and an exchange station using an asynchronous transfer mode (ATM). The exchange station comprises a plurality of primary ATM interfaces for carrying out connection of the base stations and another node, an ATM switch, N call processing processors for carrying out call control processing, where N represents a positive integer which is not less than two, a common signaling processing processor for carrying out communication control between the other node and the exchange station, an operational maintenance processor for managing the N call processing processors and the common signaling processing processor and for carrying out a path setting control for the ATM switch, and a plurality of primary base station control signal terminating equipments, disposed between the ATM switch and respective ones of the N call processing processors, the common signaling processing processor, and the operational maintenance processor, for setting links between each of the base stations and the other node and the exchange station. Each of the base stations comprises a radio interface section for radio communication between the mobile station and the base station in question, a secondary base station control signal terminating equipment for establishing an operational maintenance virtual connection link between the operational maintenance processor and the secondary base station control signal terminating equipment and N call processing virtual connection links between the N call processing processors and the secondary base station control signal terminating equipment, a central processing unit for controlling the radio interface section and the secondary base station control signal terminating equipment to select the call processing virtual connection link in order in response to an outgoing call, a secondary ATM interface for carrying out connection between the exchange station and the base station in question, and a multiplexing and demultiplexing unit for multiplexing and demultiplexing signals between the secondary ATM interface and the radio interface section and the secondary base station control signal terminating equipment.

According to a sixth aspect of this invention, a mobile communication system is for carrying out transmission between a plurality of base stations and a base station control apparatus using an asynchronous transfer mode (ATM). The base station control apparatus comprises a plurality of primary ATM interfaces for carrying out connection of the base stations and another node, an ATM switch, N call processing processors for carrying out call control processing, where N represents a positive integer which is not less than two, a common signaling processing processor for carrying out communication control between the another node and the base station control apparatus, an operational maintenance processor for managing the N call processing processors and the common signaling processing processor and for carrying out a path setting control for the ATM switch, primary base station control signal terminating equipments, disposed between the ATM switch and respective ones of the N call processing processors, the common signaling processing processor, and the operational maintenance processor, for setting links between each of the base station and the other node and the base station control apparatus. Each of the base stations comprises a radio interface section for radio communication between the mobile station and the base station in question, a secondary base station control signal terminating equipment for establishing an operational maintenance virtual connection link between the operational maintenance processor and the secondary base station control signal terminating equipment and call processing virtual connection links between the N call processing processors and the secondary base station control signal terminating equipment, a central processing unit for controlling the radio interface section and the secondary base station control signal terminating equipment to select the call processing virtual connection link in order in response to an outgoing call, a secondary ATM interface for carrying out connection between the exchange station and the base station in question, and a multiplexing and demultiplexing unit for multiplexing and demultiplexing signals between the secondary ATM interface and the radio interface section and the secondary base station control signal terminating equipment.

BRIEF DESCRIPTION OF THE DRAWING

FIG. 6 is a view showing an example of connection setting in an ATM switch for use in the mobile communication exchange station illustrated in FIG. 2;

DESCRIPTION OF THE PREFERRED EMBODIMENTS

Figure 1:
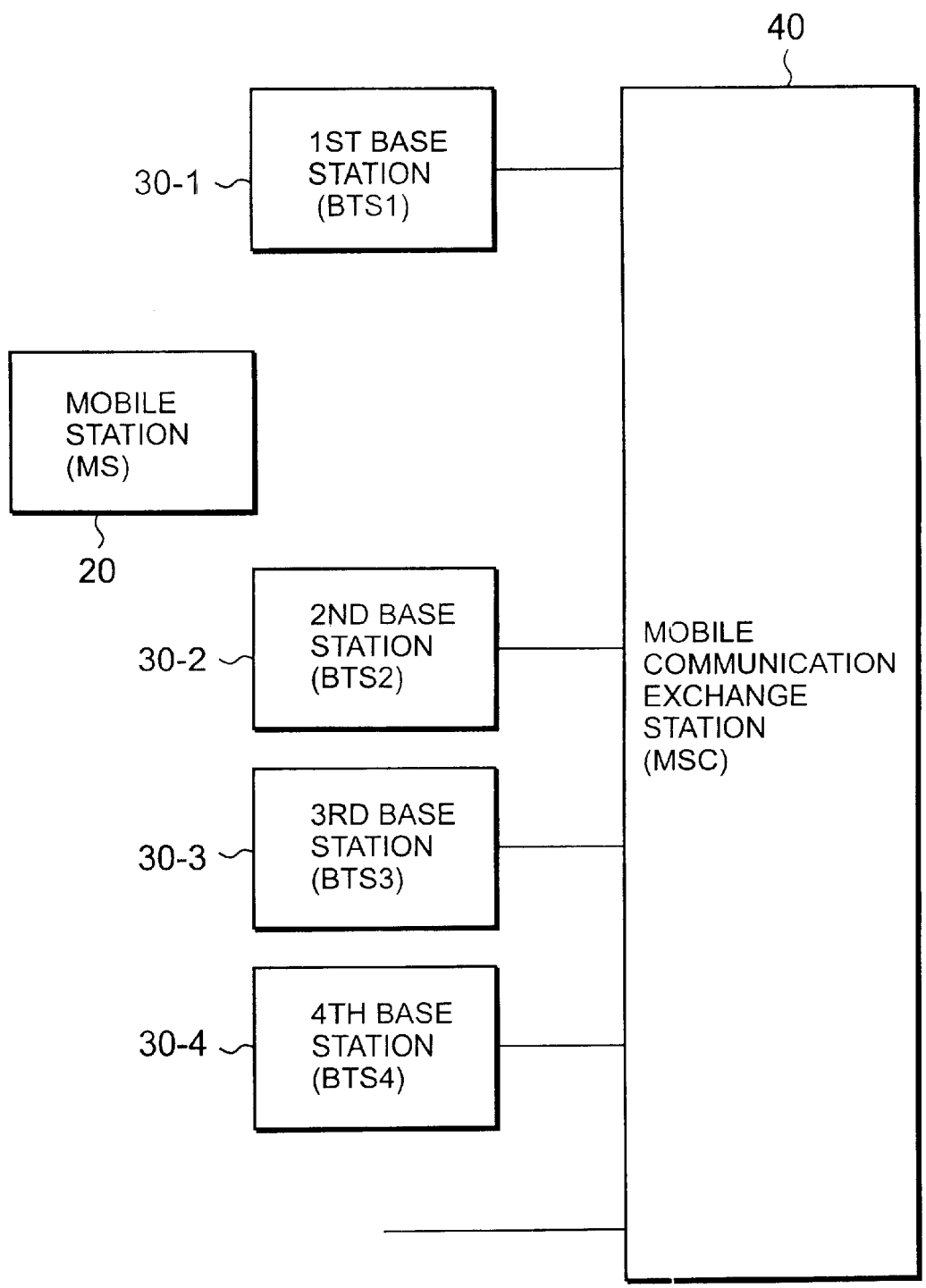
FIG. 1 is a block diagram of a mobile communication system according to a first embodiment of this invention.

Referring to FIG. 1, the description will proceed to a mobile communication system according to a first embodiment of this invention. The illustrated mobile communication system comprises a mobile station (MS) 20, a plurality of base stations (BTS) 30, a mobile communication exchange station (MSC) 40 for controlling the base stations 30. For convenience of description, in the example being illustrated, the mobile communication system comprises four base stations 30, namely, first through fourth base stations (BTS1, BTS2, BTS3, and BTS4) 30-1, 30-2, 30-3, and 30-4.

Figure 2:
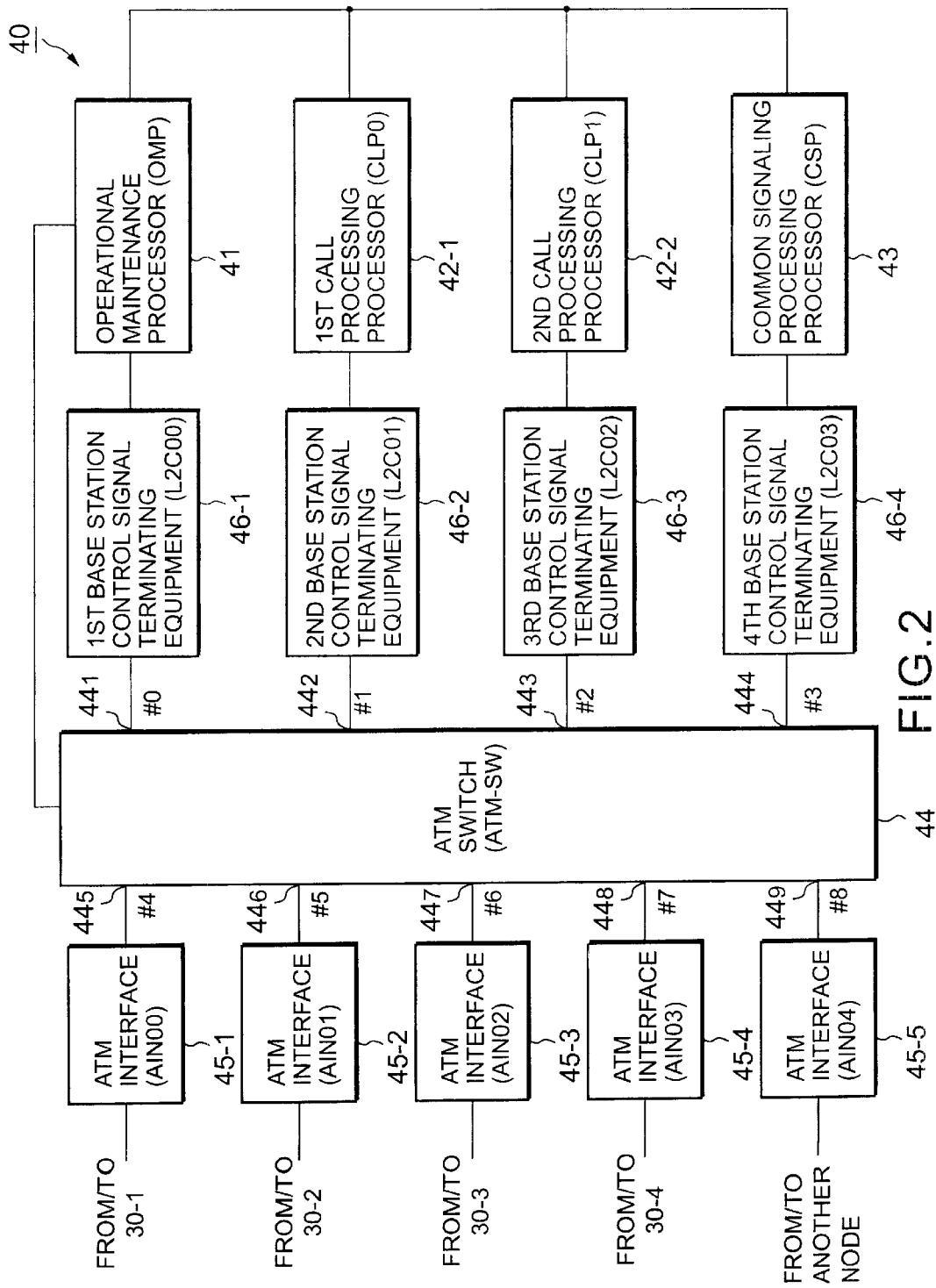
FIG. 2 is a block diagram of a mobile communication exchange station for use in the mobile communication system illustrated in FIG. 1.

Turning to FIG. 2, the description will proceed to the mobile communication exchange station 40 illustrated in FIG. 1. The mobile communication exchange station 40 comprises a plurality of processors 41, 42, and 43, an asynchronous transfer mode (ATM) switch (ATM-SW) 44, a plurality of primary ATM interfaces (AIN) 45, and a plurality of primary base station control signal terminating equipments (L2C) 46 in the manner which will become clear as the description proceeds.

More specifically, the processors 41 to 43 are classified into three types or groups. A first type of processor is an operational maintenance processor (OMP) depicted at 41. A second type of processors are N call processing processors (CLP) depicted at 42, where N represents a positive integer which is not less than two. A third type of processor is a common signaling processing processor (CSP) depicted at 43. The operational maintenance processor 41, the N call processing processors 42, and the common signaling processing processor 43 can carry out interprocessor communication. In the example being illustrated, the positive integer N is equal to two. Accordingly, two call processing processors will be hereinafter called first and second call processing processors (CLP0, CLP1) 42-1 and 42-2.

The operational maintenance processor 41 manages the first and the second call processing processors 42-1 and 42-2 and carries out a path setting control for the ATM switch 44. Each of the first and the second call processing processors 42-1 and 42-2 carries out call control processing. The common signaling processing processor 43 carries out communication control between another node (not shown).

In the manner known in the art, there is seven layers in the Open Systems Interconnection (OSI) reference model, namely, Layers 1, 2, 3, 4, 5, 6, and 7 which are called the physical layer, the data link layer, the network layer, the transport layer, the session layer, the presentation layer, and the application layer. On the other hand, there is main three layers in the ATM reference model that are called the ATM physical layer, the ATM layer, and the ATM adaptation layer. The ATM layer and the ATM adaptation layer are roughly analogous parts of the data link layer or Layer 2 of the OSI reference model. The ATM physical layer is analogous to the physical layer or Layer 1 of the OSI reference model. Throughout this specification, Layers 1 though 3 in the OSI reference model may be merely called Layers 1 through 3.

In the example being illustrated, the primary ATM interfaces 45 are equal in number to five and will be called first through five primary ATM interfaces (AIN00, AIN01, AIN02, AIN03, AIN04) 45-1, 45-2, 45-3, 45-4, and 45-5. The first through the fourth primary ATM interfaces 45-1 to 45-4 terminate Layer 1 between the mobile communication exchange unit 40 and the first through the fourth base stations 30-1 to 30-4, respectively. The fifth primary ATM interface 45-5 terminates Layer 1 between the mobile communication exchange unit 40 and the other node.

Each of the primary base station control signal terminating equipments 46 can control a plurality of protocols in Layer 2. In the example being illustrated, one of the protocols in Layer 2 is a service specific connection oriented protocol (SSCOP) which is an ATM standard protocol. The primary base station control signal terminating equipments 46 are assigned to the respective processors and connected to the ATM switch 44. Inasmuch as the processors are equal in number to four in the example being illustrated, the primary base station control signal terminating equipments 46 are equal in number to four and will referred to first through fourth primary base station control signal terminating equipments (L2C00, L2C01, L2C02, and L2C03) 46-1, 46-2, 46-3, and 46-4. Each of the first through the fourth primary base station control signal terminating equipments 46-1 to 46-4 has a plurality of links in the manner which will later become clear. The first primary base station control signal terminating equipment 46-1 is connected to the operational maintenance processor 41. The second and the third primary base station control signal terminating equipments 46-2 and 46-3 are connected to the first and the second call processing processors 42-1 and 42-2, respectively. The fourth primary base station control signal terminating equipment 46-4 is connected to the common signaling processing processor 43.

The ATM switch 44 has a plurality of input/output ports which are equal in number to a total of the processors and the primary ATM interfaces. In the example being illustrated, inasmuch as the processors (41 to 43) are equal in number to four and the primary ATM interfaces 45 are equal in number to five, the ATM switch 44 has nine input/output ports, namely, first through ninth input/output ports $44_1$, $44_2$, $44_3$, $44_4$, $44_5$, $44_6$, $44_7$, $44_8$, and $44_9$ which are assigned with port numbers of #0, #1, #2, #3, #4, #5, #6, #7, and #8, respectively.

The first input/output port $44_1$ of the ATM switch 44 is connected to the first primary base station control signal terminating equipment 46-1 for the operational maintenance processor 41. The second and the third input/output ports $44_2$ and $44_3$ of the ATM switch 44 are connected to the second and the third primary base station control signal terminating equipments 46-2 and 46-3 for the first and the second call processing processors 42-1 and 42-2, respectively. The fourth input/output port $44_4$ of the ATM switch 44 is connected to the fourth primary base station control signal terminating equipment 46-4 for the common signaling processing processor 43. The fifth through the eighth input/output ports $44_5$ to $44_8$ of the ATM switch 44 are connected to the first through the fourth primary ATM interfaces 45-1 to 45-4 for the first through the fourth base stations 30-1 to 30-4 (FIG. 1), respectively. The ninth input/output port $44_9$ of the ATM switch 44 is connected to the fifth primary ATM interface 45-5 for the other node.

Figure 3A:
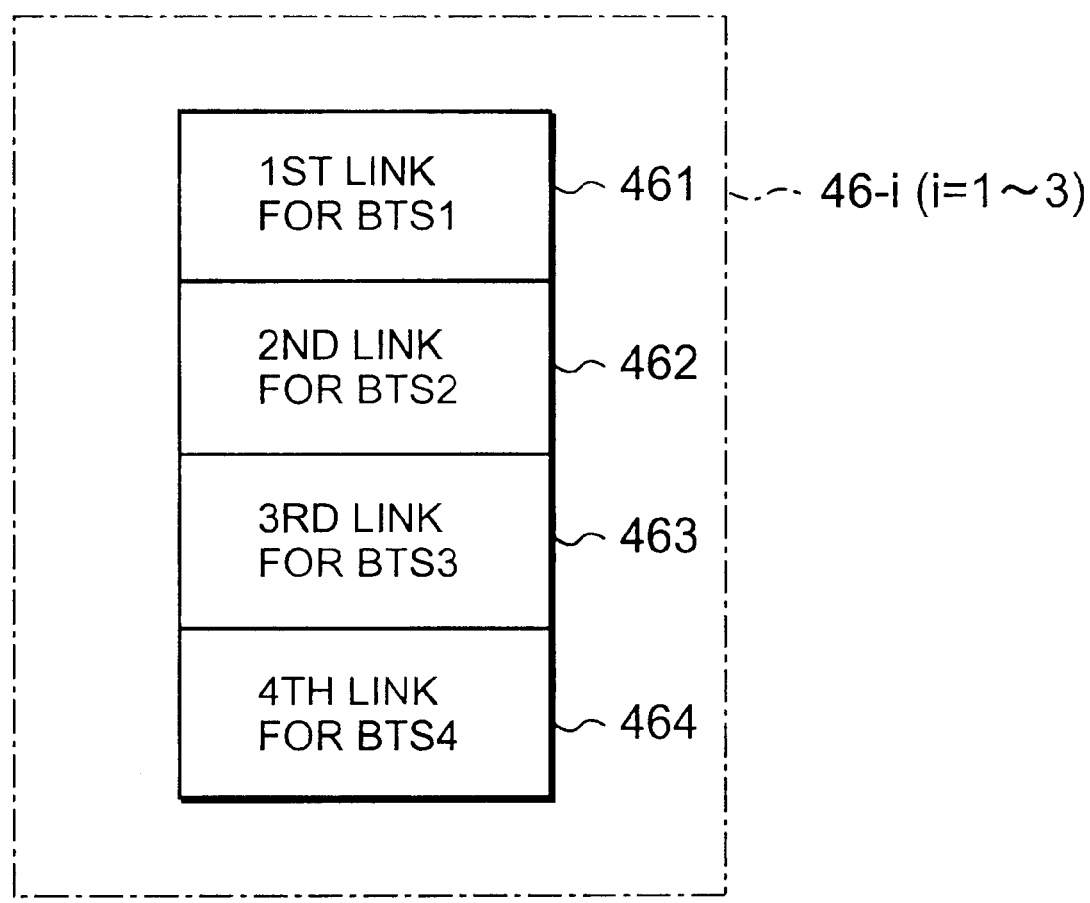
FIG. 3A is a block diagram of each of first through third primary base station control signal terminating equipments for use in the mobile communication exchange station illustrated in FIG. 2.
Figure 3B:
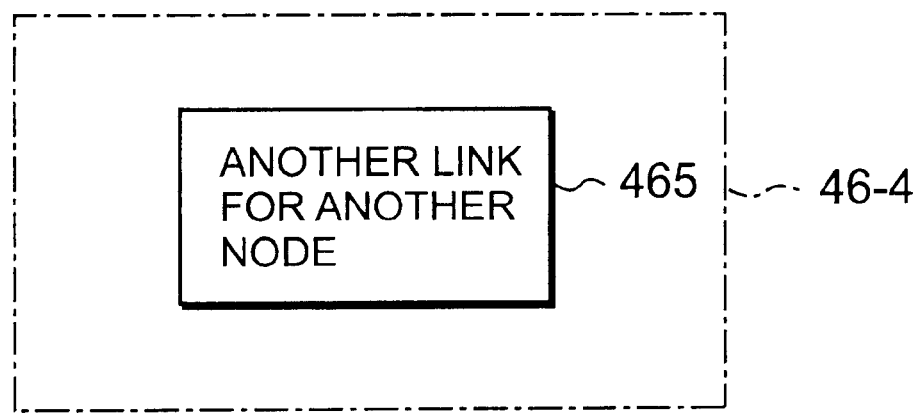
FIG. 3B is a block diagram of a fourth primary base station control signal terminating equipments for use in the mobile communication exchange station illustrated in FIG. 2.

Turning to FIGS. 3A and 3B, the description will proceed to the first through the fourth primary base station control signal terminating equipments 46-1 to 46-4 illustrated in FIG. 2. FIG. 3A illustrates each of the first through the third primary base station control signal terminating equipments 46-1 to 46-3 while FIG. 3B illustrates the fourth primary base station control signal terminating equipment 46-4.

As shown in FIG. 3A, each of the first through the third primary base station control signal terminating equipments 46-1 to 46-3 has first through fourth primary links 461, 462, 463, and 464 for the first through the fourth base stations 30-1 to 30-4 (FIG. 1). On the other hand, the fourth primary base station control signal terminating equipment 46-4 has another primary link 465 for the other node as shown in FIG. 3B.

Figure 4:
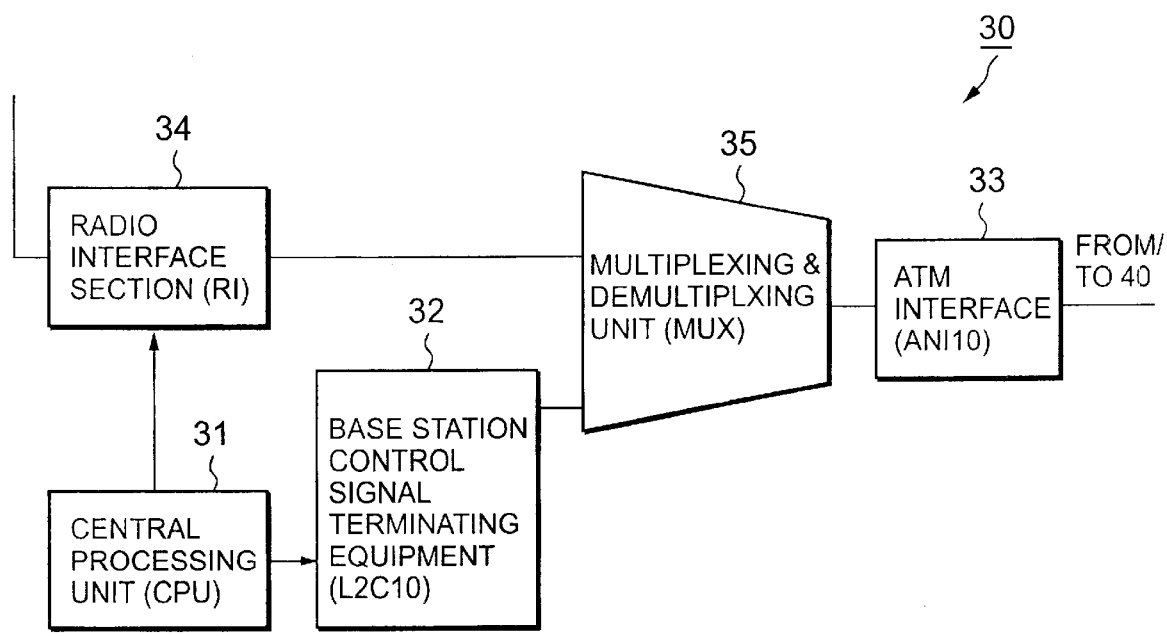
FIG. 4 is a block diagram of a base station for use in the mobile communication system illustrated in FIG. 1.

Turning to FIG. 4, the description will proceed to the base station 30 (suffix omitted) illustrated in FIG. 1. The base station 30 comprises a central processing unit (CPU) 31, a secondary base station control signal terminating equipment (L2C10) 32, a secondary ATM interface (AIN10) 33, a radio interface section (RI) 34 for radio communication between the mobile station 20 and the base station 30, and a multiplexing and demultiplexing unit (MUX) 35 for multiplexing and demultiplexing a user signal and a control signal.

The central processing unit 31 controls the radio interface section 34 and the secondary base station control signal terminating equipment 32. The secondary ATM interface 33 terminates Layer 1 between the base station 30 and the mobile communication exchange station 40 (FIG. 1). The multiplexing and the demultiplexing unit 35 has a function for multiplexing a received user signal from the radio interface section 34 and a received control signal from the secondary base station control signal terminating equipment 32 into a received multiplexed signal to supply the received multiplexed signal to the secondary ATM interface 33. In addition, the multiplexing and the demultiplexing unit 35 also has a function for demultiplexing a transmission multiplexed signal from the secondary ATM interface 33 into a transmission user signal and a transmission control signal to supply the transmission user signal and the transmission control signal to the radio interface section 34 and the secondary radio station control signal terminating equipment 32.

The radio interface section 34 sends the received user signal and the received control signal to the multiplexing and demultiplexing unit 35 and the central processing unit 31, respectively. In addition, the radio interface section 34 receives the transmission user signal and the transmission control signal from the multiplexing and demultiplexing unit 35 and the central processing unit 31, respectively.

The secondary base station control signal terminating equipments 32 can control a plurality of protocols in Layer 2. In the example being illustrated, one of the protocols in Layer 2 is a service specific connection oriented protocol (SSCOP) which is an ATM standard protocol. The secondary base station control signal terminating equipment 32 is connected to the central processing unit 31.

Figure 5:
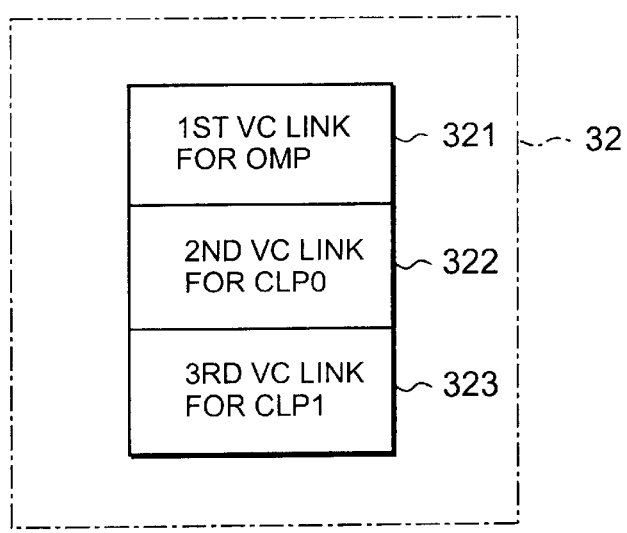
FIG. 5 is a block diagram of a secondary base station control signal terminating equipment for use in the base station illustrated in FIG. 4.

Referring to FIG. 5 in addition to 2, the secondary base station control signal terminating equipment 32 has first through third virtual connection links (which will be called "VC links") 321, 322, and 323. The first virtual connection link 321 is for establishing a virtual connection link for the operational maintenance processor 41 of the mobile communication exchange station 40. The second and the third virtual connection links 322 and 323 are for establishing virtual connection links for the first and the second call processing processors 42-1 and 42-2 of the mobile communication exchange station 40, respectively.

Turning to FIG. 6, the description will proceed to connection setting in the ATM switch 40 illustrated in FIG. 2.

The ATM switch 40 has connection numbers of 0 through 412. The connection numbers of 0 through 3 are for use in setting SSCOP links between the operational maintenance processor (OMP) 41 and the first through the fourth base stations (BTS1-BTS4) 30-1 to 30-4, respectively. The connection numbers 4 through 7 are for use in setting SSCOP links between the first call processing processor (CLP0) 42-1 and the first through the fourth base stations (BTS1-BTS4) 30-1 to 30-4, respectively. The connection numbers 8 through 11 are for use in setting SSCOP links between the second call processing processor (CLP0) 42-2 and the first through the fourth base stations (BTS1-BTS4) 30-1 to 30-4, respectively. The connection number of 12 is for use in setting an SSCOP link between the common signaling processing processor (CSP) 43 and the other node. The connection numbers of 13 through 412 are for use in setting user signals between the other node and the first through the fourth base stations (BTS1-BTS4) 30-1 to 30-4.

Figure 7:
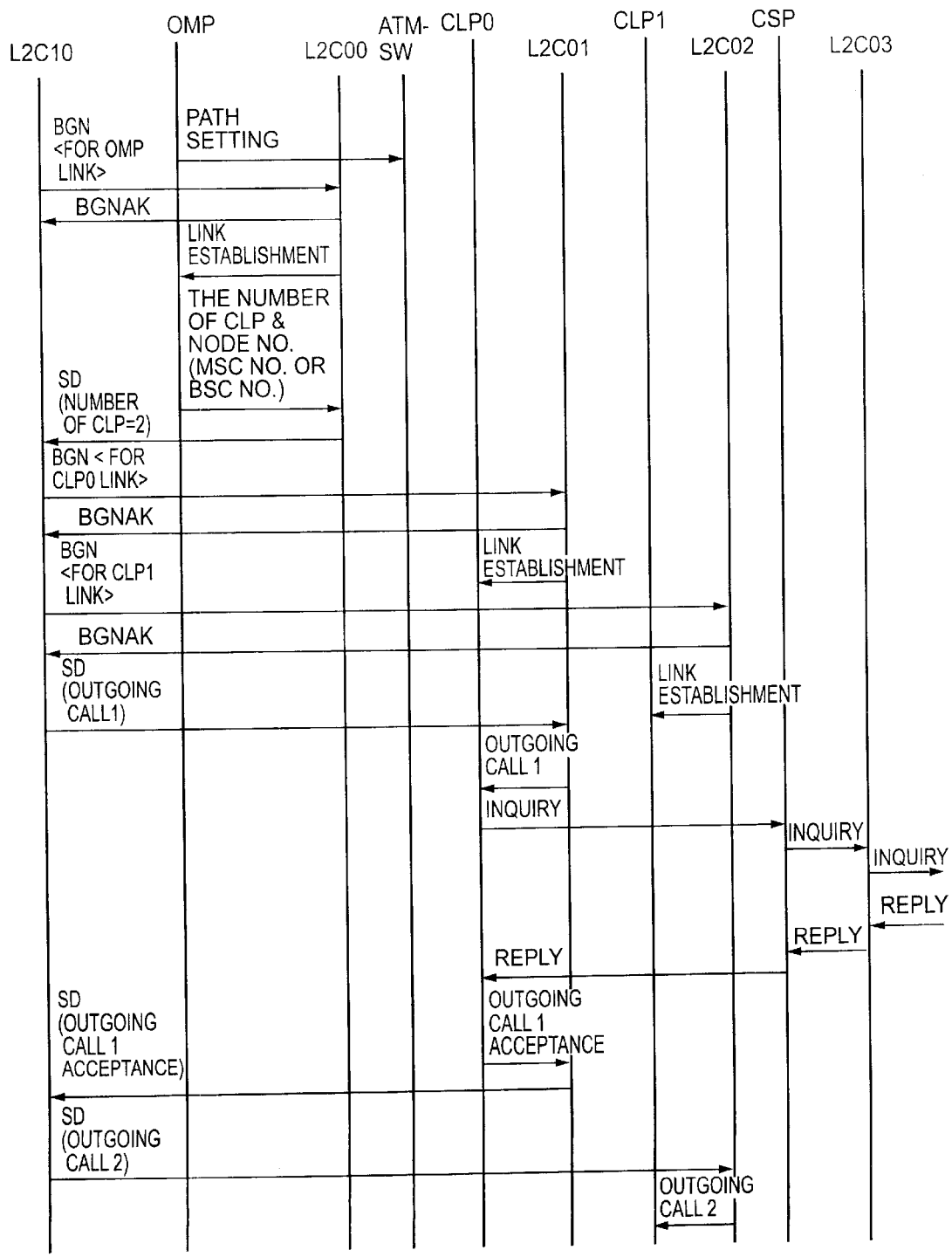
FIG. 7 is a sequence chart showing an example of operation of the mobile communication system illustrated in FIGS. 1 through 5.

Turning to FIG. 7, the description will proceed to operation of the mobile communication system according to the first embodiment of this invention. Although attention will be representatively directed to operation between the first base station (BTS1) 30-1 and the mobile communication exchange station (MSC) 40, operations between other base stations (BTS2-BTS4) 30-2 to 30-4 and the mobile communication exchange station (MSC) 40 are similar in a case of the operation between the first base station (BTS1) 30-1 and the mobile communication exchange station (MSC) 40.

At first, the operational maintenance processor (OMP) 41 of the mobile communication exchange station (MSC) 40 performs path setting for the ATM switch 44 illustrated in FIG. 6 when the system starts.

Subsequently, on starting of the first base station (BTS1) 30-1, the secondary base station control signal terminating equipment (L2C10) 32 of the first base station (BTS1) 30-1 sends a first begin signal BGN to the first primary base station control signal terminating equipment (L2C00) 46-1 for the operational maintenance processor (OMC) 41 in order to establish the VC link for the operational maintenance processor (OMC) 41 in the secondary base station control signal terminating equipment (L2C10) 32. When the first primary base station control signal terminating equipment (L2C00) 46-1 for the operational maintenance processor (OMP) 41 receives the first begin signal BGN, the first primary base station control signal terminating equipment (L2C00) 46-1 for the operational maintenance processor (OMP) 41 sends a first begin acknowledgment signal BGNAK to the secondary base station control signal terminating equipment (L2C10) 32 of the first base station (BTS1) 30-1 and reports establishment of the VC link for the first base station (BTS1) 30-1 to the operational maintenance processor (OMP) 41.

When the operational maintenance processor (OMP) 41 receives the report of the establishment of the VC link for the first base station (BTS1) 30-1, the operational maintenance processor (OMP) 41 sends, to the first primary base station control signal terminating equipment (L2C00) 46-1, an instruction signal to instruct the first base station (BTS1) in the number of the call processing processors (CLP) of the system and a node number indicative of the mobile communication exchange station (MSC) 40. In the example being illustrated, the first primary base station control signal terminating equipment (L2C00) 46-1 sends, to the first base station (BTS1) 30-1, a signal indicative of the number of the call processing processors (CLP) that is equal to two.

In the fist base station (BTS1) 30-1, the secondary base station control signal terminating equipment (L2C10) sends a second begin signal BGN to the second primary base station control signal terminating equipment (L2C01) 46-2 in order to establish the VC link for the first call processing processor (CLP0) 42-1. When the second primary base station control signal terminating equipment (L2C01) 46-2 receives the second begin signal BGN, the second primary base station control signal terminating equipment (L2C01) sends a second begin acknowledgment signal BGNAK to the secondary base station control signal terminating equipment (L2C10) and reports establishment of the VC link for the first base station (BTS1) 30-1 to the first call processing processor (CLP0) 42-1.

Likewise, the secondary base station control signal terminating equipment (L2C10) sends a third begin signal BGN to the third primary base station control signal terminating equipment (L2C02) 46-3 in order to establish the VC link for the second call processing processor (CLP1) 42-2. When the third primary base station control signal terminating equipment (L2C02) 46-3 receives the third begin signal BGN, the third primary base station control signal terminating equipment (L2C02) sends a third begin acknowledgment signal BGNAK to the secondary base station control signal terminating equipment (L2C10) and reports establishment of the VC link for the first base station (BTS1) 30-1 to the second call processing processor (CLP1) 42-2.

In the above-mentioned operation, the first base station (BTS1) 30-1 is put into a communicable state where the first base station (BTS1) 30-1 communicates with the operational maintenance processor (OMP) 41, the first call processing processor (CLP0) 42-1, and the second call processing processor (CLP1) 42-2. With the similar procedures, the other base stations (BTS2-BTS4) 30-2 to 30-4 are put into communicable states where the other base stations (BTS2-BTS4) 30-2 to 30-4 communicate with the operational maintenance processor (OMP) 41, the first call processing processor (CLP0) 42-1, and the second call processing processor (CLP1) 42-2.

Now, the description will proceed to operation of call processing in a case of the first base station (BTS1) 30-1.

It will be assumed that a first outgoing call 1 occurs in the first base station (BTS1) 30-1. In this event, the first base station (BTS1) 30-1 informs, using the VC link for the first call processing processor (CLP0) 42-1, the first call processing processor (CLP0) 42-1 of a first outgoing call signal indicative of the first outgoing call 1. In order to inquire into an incoming side, the first call processing processor (CLP0) 42-1 carries out interprocessor communication with the common signaling processing processor (CSP) 43 to make the common signaling processing processor (CSP) 43 inquire to the other node. When a reply of an inquire result is turned back to the common signaling processing processor (CSP) 43, a replay signal is transferred from the common signaling processing processor (CSP) 43 to the first call processing processor (CLP0) 42-1. An acceptance signal for the first outgoing call 1 is sent from the first call processing processor (CLP0) 42-1 to the first base station (BTS1) via the second primary base station control signal terminating equipment (L2C01) 46-2. In the manner which is described above, the call processing for the first outgoing call 1 is made in the first call processing processor (CLP0) 42-1.

It will be presumed that a second outgoing call 2 occurs in the first base station (BTS1) 30-1. In this event, the VC link for the second call processing processor (CLP1) 42-2 is used and a second outgoing call signal indicative of the second outgoing call 2 is sent to the second call processing processor (CLP1) 42-2 via the third primary base station control signal terminating equipment (L2C02) 46-3.

In the manner which is described above, the VP links to be used are rotated in order and the outgoing call signals are equally sent to the first and the second call processing processors (CLP0, CLP1) 42-1 and 42-2. As a result, it is possible to equalize load balance.

Now, the description will proceed to operation in a case where a failure occurs in one of the call processing processors (CLP).

It will be assumed that a base station (BTS) detects that a failure occurs in a VP link for a call processing processor. Under the circumstances, the base station carries out processing so as to remove the VP link in question from assignment rotation.

In addition, in the mobile communication exchange station (MSC) 40, the operational maintenance processor (OMP) 41 confirms or makes a health check whether or not the call processing processors (CLP) normally operate. More specifically, the operational maintenance processor (OMP) 41 periodically sends a request message to the call processing processors (CLP). When each call processing processor (CLP) receives the request message, the call processing processor (CLP) sends a replay message corresponding to the request message to the operational maintenance processor (OMP) 41. If the operational maintenance processor (OMP) 41 receives the replay message, the operational maintenance processor (OMP) 41 determines that the call processing processor (CLP) in question normally operates. In the operational maintenance processor (OMP) 41 does not receive the replay message within a predetermined time interval, the operational maintenance processor (OMP) 41 determines that a failure occurs in the call processing processor (CLP) in question.

When the operational maintenance processor (OMP) 41 detects abnormality in the call processing processor (CLP), the operational maintenance processor (OMP) 41 instructs, using the VC link for the operational maintenance processor (OMC), each base station (BTS) to disable the call processing processor (CLP) in question. Accordingly, each base station (BTS) never uses a nonusable link for the abnormality of the call processing processor (CLP). For this purpose, the VC link for the operational maintenance processor (OMC) may be preferably duplicated.

Figure 8:
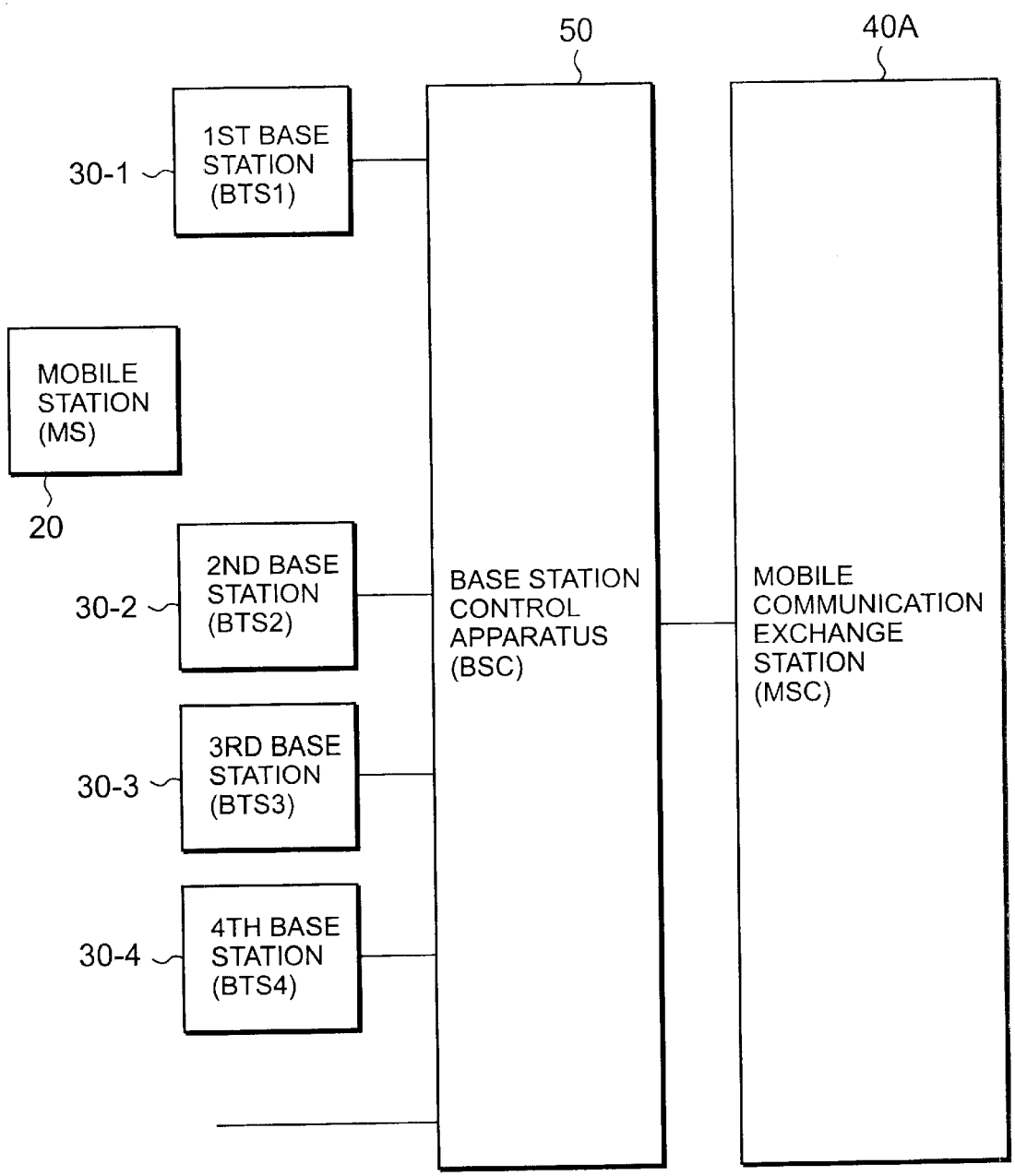
FIG. 8 is a block diagram of a mobile communication system according to a second embodiment of this invention.

Referring to FIG. 8, the description will proceed to a mobile communication system according to a second embodiment of this invention. The illustrated mobile communication system comprises the mobile station (MS) 20, the plurality of base stations (BTS) 30, a base station control apparatus (BSC) 50 for the base stations 30, and a mobile communication exchange station (MSC) 40A connected to the base station control apparatus 50. For convenience of description, in the example being illustrated, the mobile communication system comprises four base stations 30, namely, the first through the fourth base stations (BTS1, BTS2, BTS3, and BTS4) 30-1, 30-2, 30-3, and 30-4.

Figure 9:
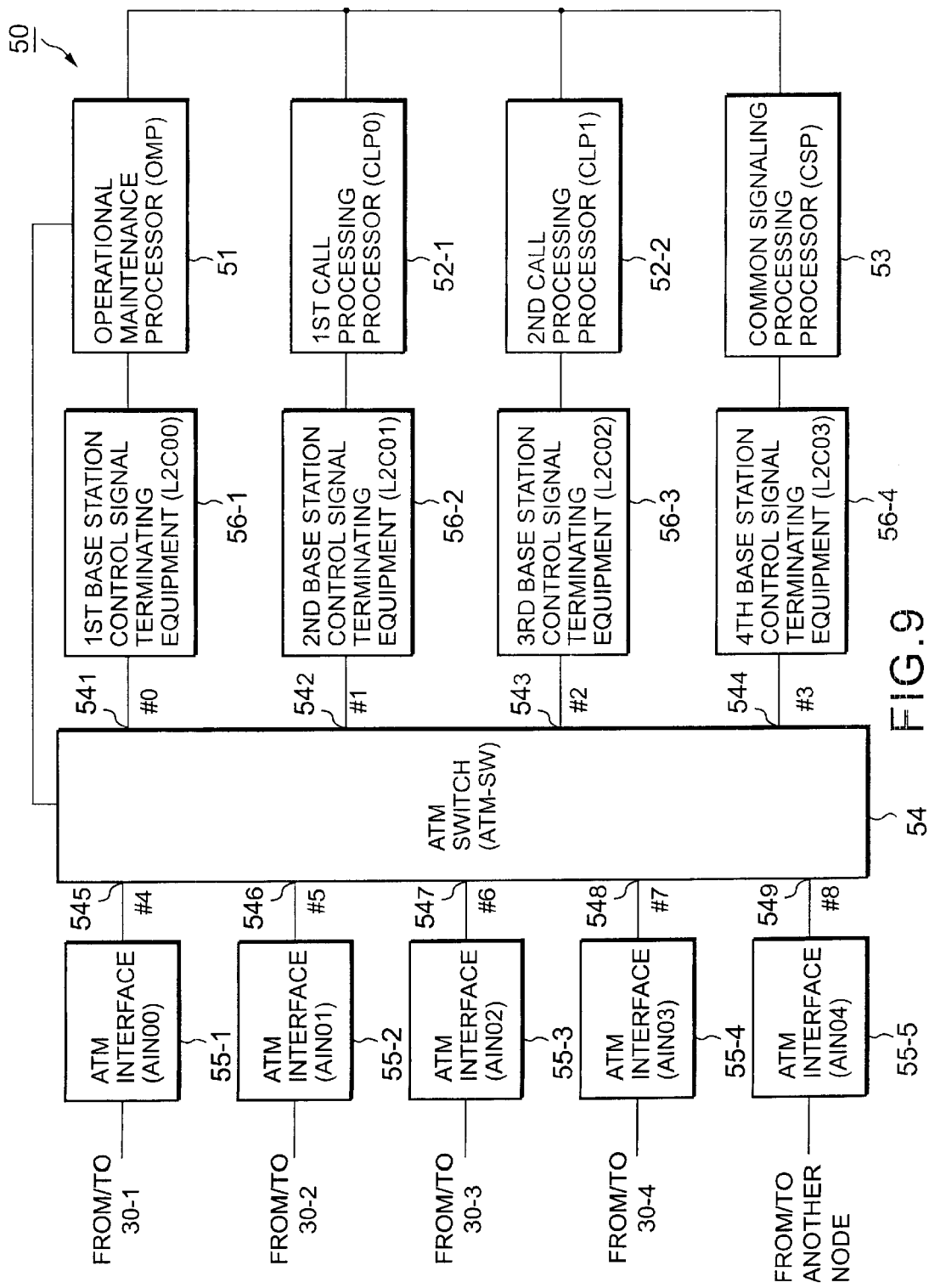
FIG. 9 is a block diagram of a base station control apparatus for use in the mobile communication system illustrated in FIG. 8.

Turning to FIG. 9, the description will proceed to the base station control apparatus 50 illustrated in FIG. 8. The base station control apparatus 50 is similar in structure and operation to the mobile communication exchange station 40 illustrated in FIG. 2. That is, the base station control apparatus 50 comprises a plurality of processors 51, 52, and 53, an asynchronous transfer mode (ATM) switch (ATM-SW) 54, a plurality of primary ATM interfaces (AIN) 55, and a plurality of primary base station control signal terminating equipments (L2C) 56 in the manner which will become clear as the description proceeds.

More specifically, the processors 51 to 53 are classified into three types or groups. A first type of processor is an operational maintenance processor (OMP) depicted at 51. A second type of processors are N call processing processors (CLP) depicted at 52, where N represents a positive integer which is not less than two. A third type of processor is a common signaling processing processor (CSP) depicted at 53. The operational maintenance processor 51, the N call processing processors 52, and the common signaling processing processor 53 can carry out interprocessor communication. In the example being illustrated, the positive integer N is equal to two. Accordingly, two call processing processors will be hereinafter called first and second call processing processors (CLP0, CLP1) 52-1 and 52-2.

The operational maintenance processor 51 manages the first and the second call processing processors 52-1 and 52-2 and carries out a path setting control for the ATM switch 54. Each of the first and the second call processing processors 52-1 and 52-2 carries out call control processing. The common signaling processing processor 53 carries out communication control between another node (not shown).

In the example being illustrated, the primary ATM interfaces 55 are equal in number to five and will be called first through five primary ATM interfaces (AIN00, AIN01, AIN02, AIN03, AIN04) 55-1, 55-2, 55-3, 55-4, and 55-5. The first through the fourth primary ATM interfaces 55-1 to 55-4 terminate Layer 1 between the base station control apparatus 50 and the first through the fourth base stations 30-1 to 30-4, respectively. The fifth primary ATM interface 55-5 terminates Layer 1 between the base station control apparatus 50 and the other node.

Each of the primary base station control signal terminating equipments 56 can control a plurality of protocols in Layer 2. In the example being illustrated, one of the protocols in Layer 2 is a service specific connection oriented protocol (SSCOP) which is an ATM standard protocol. The primary base station control signal terminating equipments 56 are assigned to the respective processors and connected to the ATM switch 54. Inasmuch as the processors are equal in number to four in the example being illustrated, the primary base station control signal terminating equipments 56 are equal in number to four and will referred to first through fourth primary base station control signal terminating equipments (L2C00, L2C01, L2C02, and L2C03) 56-1, 56-2, 56-3, and 56-4. Each of the first through the fourth primary base station control signal terminating equipments 56-1 to 56-4 has a plurality of links in the manner which will later become clear. The first primary base station control signal terminating equipment 56-1 is connected to the operational maintenance processor 51. The second and the third primary base station control signal terminating equipments 56-2 and 56-3 are connected to the first and the second call processing processors 52-1 and 52-2, respectively. The fourth primary base station control signal terminating equipment 56-4 is connected to the common signaling processing processor 53.

The ATM switch 54 has a plurality of input/output ports which are equal in number to a total of the processors and the primary ATM interfaces. In the example being illustrated, inasmuch as the processors (51 to 53) are equal in number to four and the primary ATM interfaces 55 are equal in number to five, the ATM switch 54 has nine input/output ports, namely, first through ninth input/output ports $54_1$, $54_2$, $54_3$, $54_4$, $54_5$, $54_6$, $54_7$, $54_8$, and $54_9$ which are assigned with port numbers of #0, #1, #2, #3, #4, #5, #6, #7, and #8, respectively.

The first input/output port 541 of the ATM switch 54 is connected to the first primary base station control signal terminating equipment 56-1 for the operational maintenance processor 51. The second and the third input/output ports $54_2$ and $54_3$ of the ATM switch 54 are connected to the second and the third primary base station control signal terminating equipments 56-2 and 56-3 for the first and the second call processing processors 52-1 and 52-2, respectively. The fourth input/output port $54_4$ of the ATM switch 54 is connected to the fourth primary base station control signal terminating equipment 56-4 for the common signaling processing processor 53. The fifth through the eighth input/output ports $54_5$ to $54_8$ of the ATM switch 54 are connected to the first through the fourth primary ATM interfaces 55-1 to 55-4 for the first through the fourth base stations 30-1 to 30-4 (FIG. 8), respectively. The ninth input/output port $54_9$ of the ATM switch 54 is connected to the fifth primary ATM interface 55-5 for the other node.

Figure 10A:
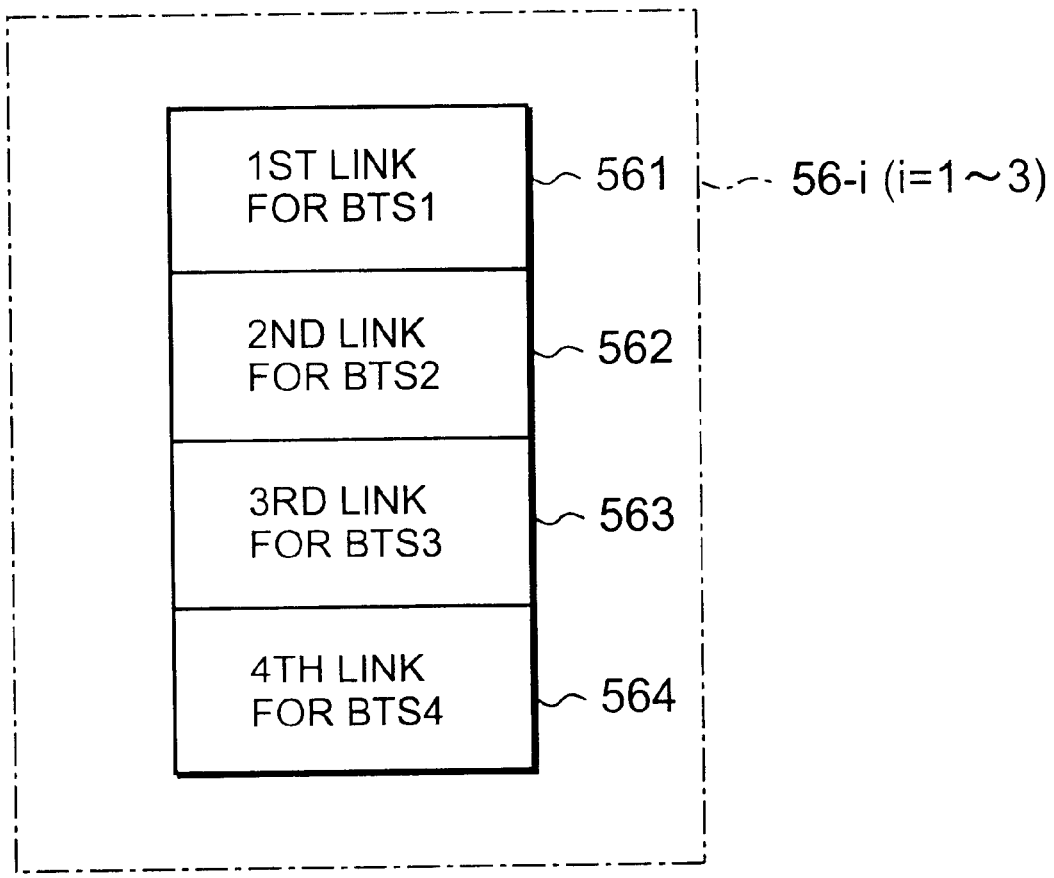
FIG. 10A is a block diagram of each of first through third primary base station control signal terminating equipments for use in the base station control apparatus illustrated in FIG. 9.
Figure 10B:
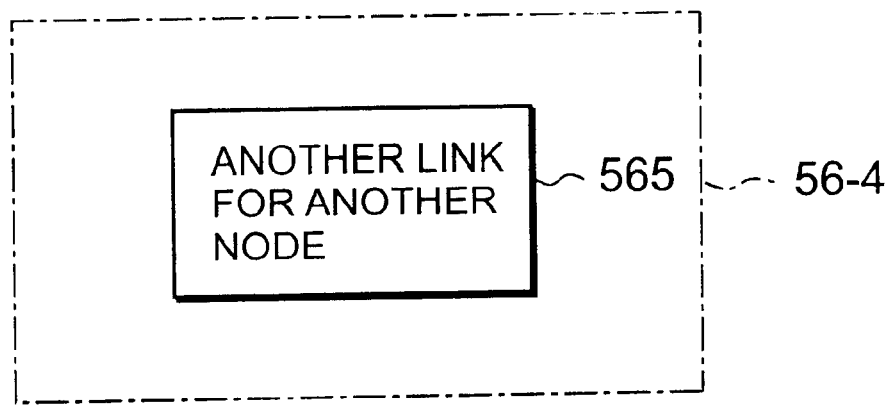
FIG. 10B is a block diagram of a fourth primary base station control signal terminating equipments for use in the base station control apparatus illustrated in FIG. 9.

Turning to FIGS. 10A and 10B, the description will proceed to the first through the fourth primary base station control signal terminating equipments 56-1 to 56-4 illustrated in FIG. 9. FIG. 10A illustrates each of the first through the third primary base station control signal terminating equipments 56-1 to 56-3 while FIG. 10B illustrates the fourth primary base station control signal terminating equipment 56-4.

As shown in FIG. 10A, each of the first through the third primary base station control signal terminating equipments 56-1 to 56-3 has first through fourth primary links 561, 562, 563, and 564 for the first through the fourth base stations 30-1 to 30-4 (FIG. 8). On the other hand, the fourth primary base station control signal terminating equipment 56-4 has another primary link 565 for the other node as shown in FIG. 10B.

Inasmuch as operation of the mobile communication system according to the second embodiment of this invention is similar in that according to the first embodiment of this invention, description of the operation of the mobile communication system according to the second embodiment of this invention is omitted.

Now, the description will proceed to operation on handover of the mobile station (MS) 20.

The central processing unit 31 of the base station (BTS) 30 transmits, to the mobile station (MS) 20 via the radio interface section (RI) 34, an outgoing call acceptance signal with the identification number of the call processing processor (CLP) currently used for the mobile station (MS) 20 and the node number attached to the outgoing call acceptance signal. The identification number of the call processing processor (CLP) is hereinafter called a "CLP number." The node number is a number for identifying the mobile communication exchange station (MSC) 40 which is currently connected to the mobile station (MS) 20 in a case of the first embodiment of this invention illustrated in FIG. 1 while the node number is a number for identifying the base station control apparatus (BSC) 50 which is currently connected to the mobile station (MS) 20 in a case of the second embodiment of this invention illustrated in FIG. 8.

The mobile station (MS) 20 stores or holds the informed CLP number and the informed node number as a held CLP number and a held node number. On handover, the mobile station (MS) 20 transmits a handover request message to a new base station (BTS) with the held CLP number and the held node number attached to the handover request message. Destined for the handover, the new base station (BTS) determines, in accordance with the node number within the handover request message, that the handover is that within the same mobile communication exchange station (MSC) 40 or within the same base station control apparatus (BSC) 50. In a case where the handover is that within the same one, the new base station (BTS) sends, in accordance with the held CLP number within the handover request message, the message to the same call processing processor (CLP) with its connection. When the handover is not that within the same one, the new base station (BTS) sends, in accordance with order in load distribution, the message to a call processing processor (CLP) by allocating connections in order in the similar manner in the outgoing call.

In the manner which is described above, when the mobile station (MS) 20 carries out the handover, it is possible to use the same call processing processor (CLP) on the outgoing call in a case where the handover is that within the same mobile communication exchange station (MSC) 40 or within the same base station control apparatus (BSC) 50. In a case where the handover is that between different mobile communication exchange stations (MSC) or between different base station control apparatuses (BSC), it is possible to use a new call processing processor (CLP) in accordance with order in the load distribution. As a result, it is possible to maintain equality in load for the call processing processors (CLP).

Figure 11:
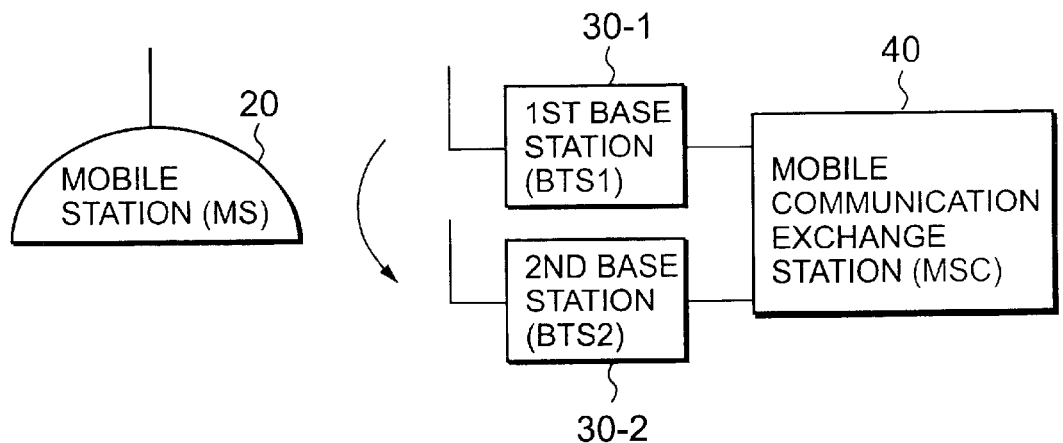
FIG. 11 is a block diagram for use in describing operation on handover within the same mobile communication exchange station in a case of the first embodiment of this invention.
Figure 12:
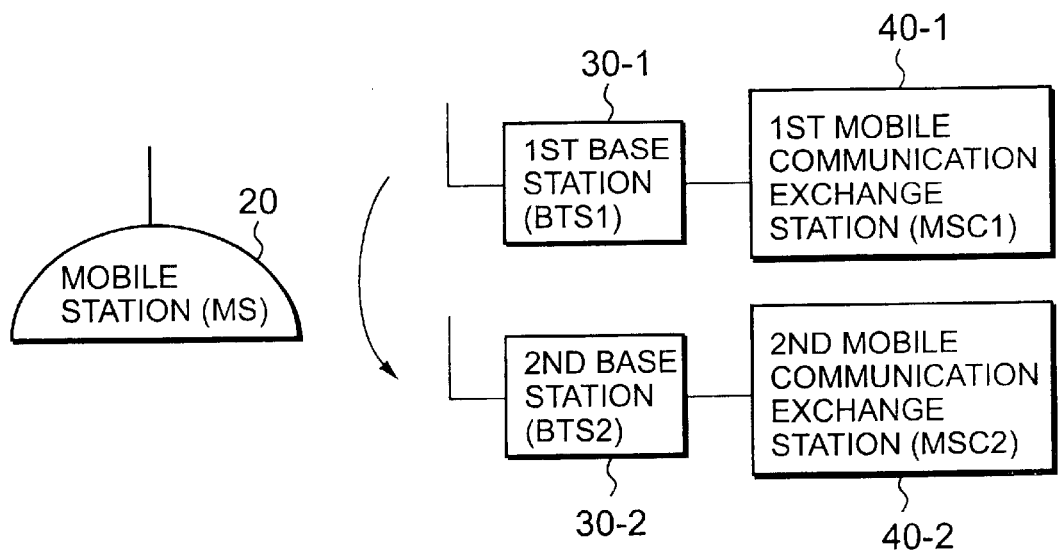
FIG. 12 is a block diagram for use in describing operation on handover between mobile communication exchange stations in a case of the first embodiment of this invention.
Figure 13:
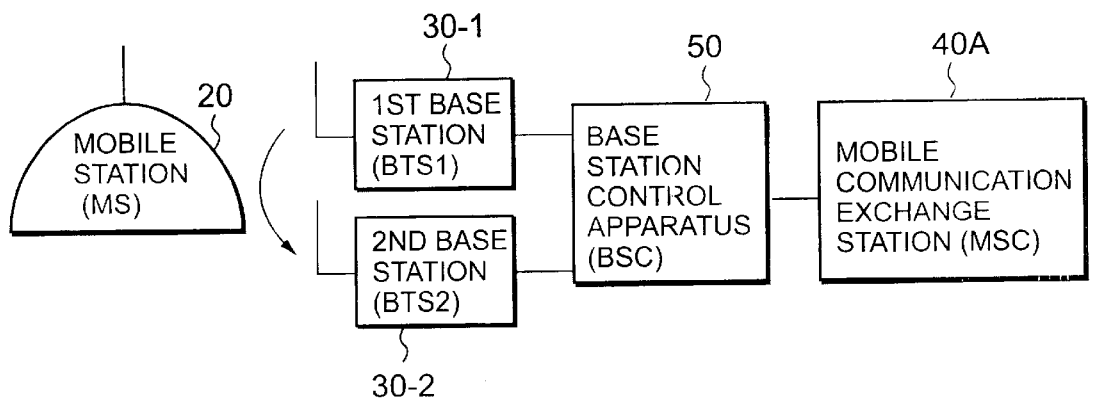
FIG. 13 is a block diagram for use in describing operation on handover within the same base station control apparatus in a case of the second embodiment of this invention.
Figure 14:
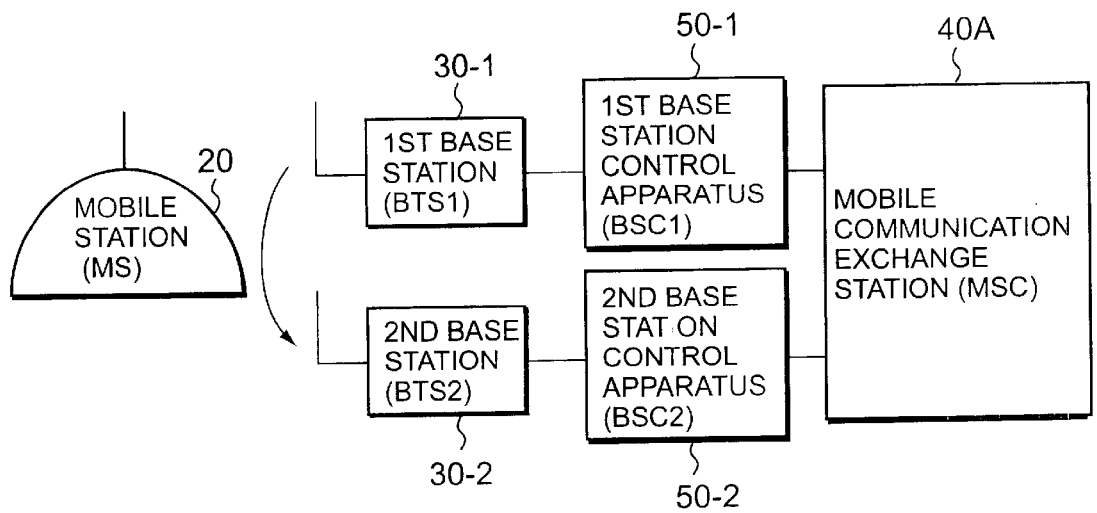
FIG. 14 is a block diagram for use in describing operation on handover between base station control apparatuses connected to the same mobile communication exchange station in a case of the second embodiment of this invention.
Figure 15:
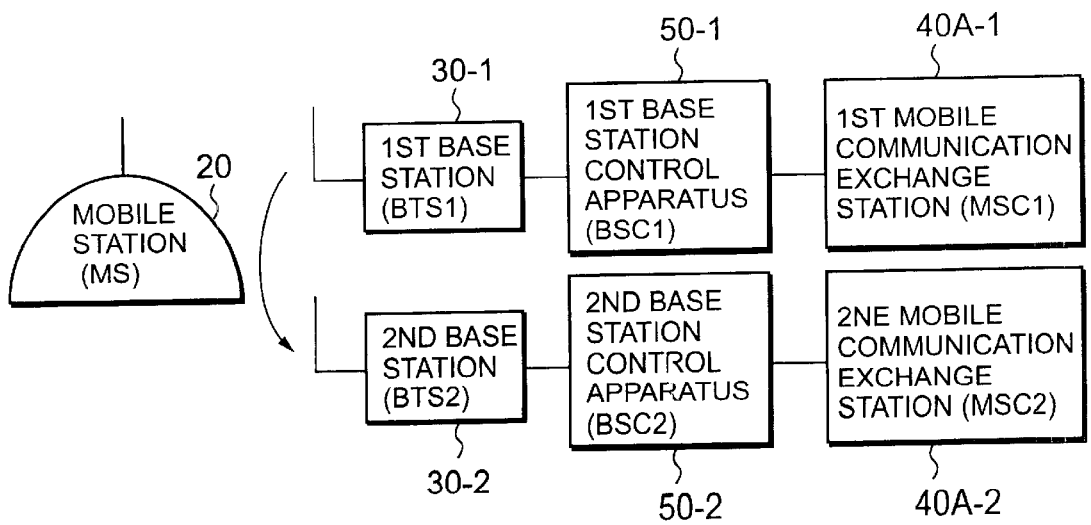
FIG. 15 is a block diagram for use in describing operation on handover between base station control apparatuses connected to respective mobile communication exchange stations in a case of the second embodiment of this invention.

Referring to FIGS. 11, 12, 13, 14, and 15, the description will proceed to operations on the handover described above. FIGS. 11 and 12 show system structures in a case of the mobile communication system according to the first embodiment of this invention illustrated in FIG. 1 while FIGS. 13 to 15 show system structures in another case of the mobile communication system according to the second embodiment of this invention illustrated in FIG. 8.

FIG. 11 shows a case where the mobile station (MS) 20 makes a handover from the first base station (BTS1) 30-1 to the second base station (BTS2) 30-2 and the first and the second base stations 30-1 and 30-2 are connected to the same mobile communication exchange station (MSC) 40. Under the circumstances, the same call processing processor (CLP) is used in the mobile communication exchange station (MSC) 40.

FIG. 12 shows another case where the mobile station (MS) 20 makes a handover from the first base station (MTS1) 30-1 to the second base station (BTS2) 30-2 and the first and the second base stations 30-1 and 30-2 are connected to first and second mobile communication exchange stations (MSC1, MSC2) 40-1 and 40-2, respectively. Under the circumstances, a new call processing processor (CLP) is used, in accordance with order of the load distribution, in the second mobile communication exchange station (MSC2) 40-2.

FIG. 13 shows a case where the mobile station (MS) 20 makes a handover from the first base station (BTS1) 30-1 to the second base station (BTS2) 30-2 and the first and the second base stations 30-1 and 30-2 are connected to the same base station control apparatus (BSC) 50. Under the circumstances, the same call processing processor (CLP) is used in the base station control apparatus (BSC) 50.

FIG. 14 shows another case where the mobile station (MS) 20 makes a handover from the first base station (MTS1) 30-1 to the second base station (BTS2) 30-2 and the first and the second base stations 30-1 and 30-2 are connected to first and second base station control apparatuses (BSC1, BSC2) 50-1 and 50-2, respectively, which are connected to the same mobile communication exchange station (MSC) 40A. Under the circumstances, a new call processing processor (CLP) is used, in accordance with order of the load distribution, in the second base station control apparatus (BSC2) 50-2.

FIG. 15 shows still another case where the mobile station (MS) 20 makes a handover from the first base station (MTS1) 30-1 to the second base station (BTS2) 30-2 and the first and the second base stations 30-1 and 30-2 are connected to first and second base station control apparatuses (BSC1, BSC2) 50-1 and 50-2, respectively, which are connected to first and second mobile communication exchange stations (MSC1, MSC2) 40A-1 and 40A-2, respectively. Under the circumstances, a new call processing processor (CLP) is used, in accordance with order of the load distribution, in the second base station control apparatus (BSC2) 50-2 in the manner which is described in conjunction with FIG. 14.

Figure 16:
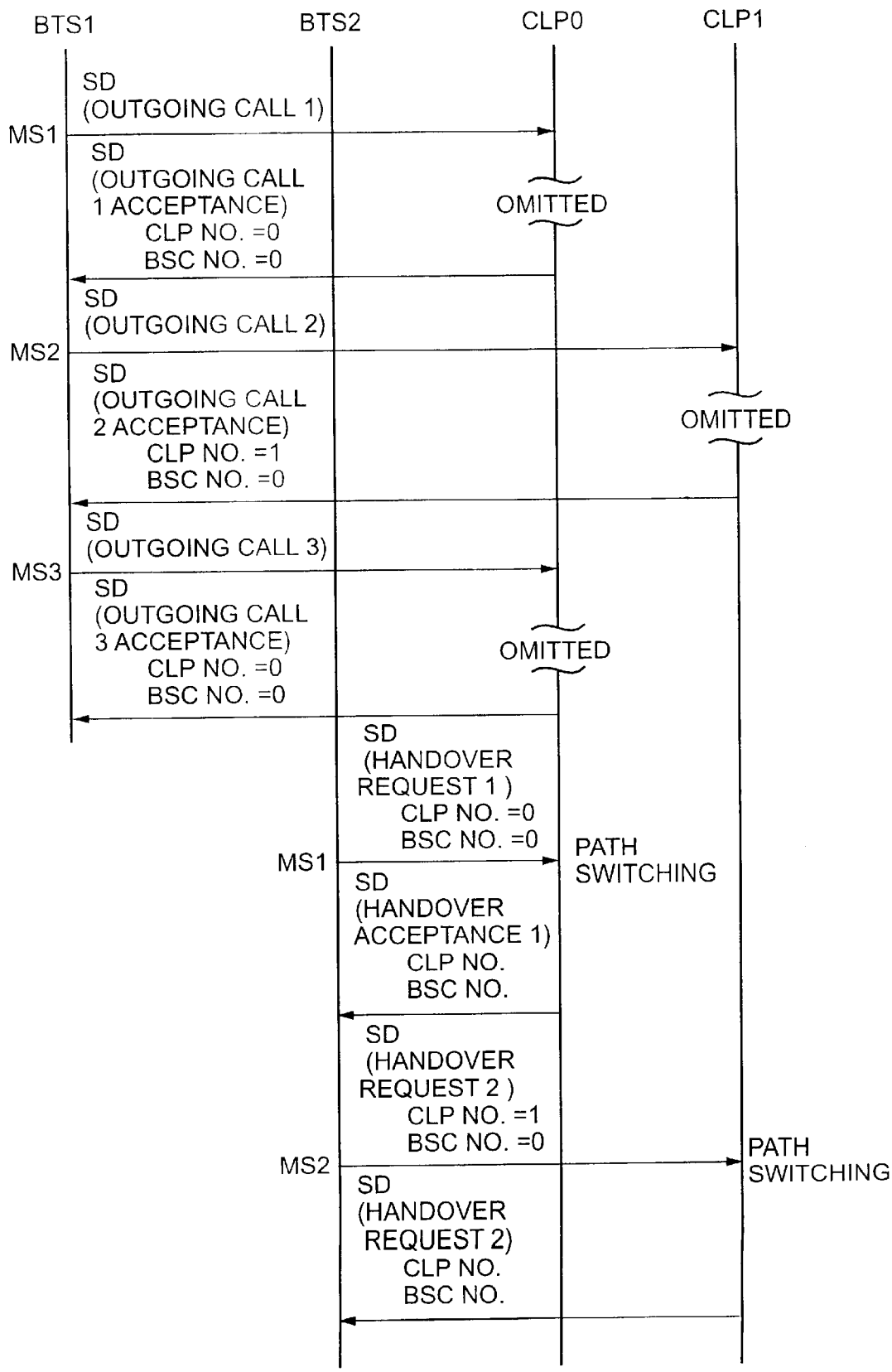
FIG. 16 is a sequence chart for use in describing operation on handover of a mobile station initiative type.

FIG. 16 is a sequence diagram showing an operation example of the handover of a mobile station initiative type in the mobile communication system illustrated in FIG. 8. The handover of the mobile station initiative type is a handover where a base station to be changed receives a handover request from a mobile station. In the example being illustrated, the handover is that within the same base station control apparatus (BSC) 50. The illustrated mobile communication system comprises first through third mobile stations MS1, MS2, and MS3, first and second base stations BTS1 and BTS2, and a base station control apparatus BSC connected to the first and the second base stations BTS1 and BTS2. The base station control apparatus BSC comprises first and second call processing processors CLP0 and CLP2. The first and the second call processing processors CLP0 and CLP1 are assigned with the CLP numbers of 0 and 1, respectively. In addition, the base station control apparatus BSC is assigned with, as the node number, a BSC number of 0.

It is assumed that the first through the third mobile stations MS1 to MS3 lie a first cell where the first base station BTS1 covers.

Under the circumstances, when the first base station BTS1 receives a first outgoing call signal from the first mobile station MS1, the first base station BTS1 sends the first outgoing call signal to the first call processing processor CLP0 in the base station control apparatus BSC. The first call processing processor CLP0 sends, to the first base station BTS1, a first incoming call acceptance signal with the CLP number of 0 and the BSC number of 0. The first base station BTS1 sends, to the first mobile station MS1, the first incoming call acceptance signal with the CLP number of 0 and the BSC number of 0. The first mobile station MS1 stores or holds the CLP number of 0 and the BSC number of 0 as a held CLP number and a held BSC number.

Likewise, when the first base station MTS1 receives a second outgoing call signal from the second mobile station MS2, the first base station MTS2 sends the second outgoing call signal to the second call processing processor CLP1 in the base station control apparatus BSC. The second call processing processor CLP1 send, to the first base station BTS1, a second incoming call acceptance signal with the CLP number of 1 and the BSC number of 0. The first base station BTS1 sends, to the second mobile station MS2, the second incoming call acceptance signal with the CLP number of 1 and the BSC number of 0. The second mobile station MS2 stores or holds the CLP number of 1 and the BSC number of 0 as a held CLP number and a held BSC number.

When the first base station BTS1 receives a third outgoing call signal from the third mobile station MS3, the first base station BTS1 sends the third outgoing call signal to the first call processing processor CLP0 in the base station control apparatus BSC. The first call processing processor CLP0 sends, to the first base station BTS1, a third incoming call acceptance signal with the CLP number of 0 and the BSC number of 0. The first base station BTS1 sends, to the third mobile station MS3, the third incoming call acceptance signal with the CLP number of 0 and the BSC number of 0. The third mobile station MS3 stores or holds the CLP number of 0 and the BSC number of 0 as a held CLP number and a held BSC number.

It is presumed that the first mobile station MS1 moves from the first cell toward a second cell where the second base station BTS2 covers. In this event, the first mobile station MS1 sends, to the second base station BTS2, a first handover request signal with the held CLP number of 0 and the held BSC number of 0. The second base station BTS2 sends, to the first call processing processor CLP0 in the base station control apparatus BSC, the first handover request signal with the held CLP number of 0 and the held BSC number of 0. The first call processing processor CLP0 in the base station control apparatus BSC sends a first handover acceptance signal to the second base station BTS2 with the CLP number and the BSC number attached to the first handover acceptance signal. The second base station BTS2 sends, to the first mobile station MS1, the first handover acceptance signal with the CLP number and the BSC number. The first mobile station MS1 stores or holds the CLP number and the BSC number as a held CLP number and a held BSC number.

It is assumed that the second mobile station MS2 moves from the first cell toward the second cell. In this event, the second mobile station MS2 sends, to the second base station BTS2, a second handover request signal with the held CLP number of 1 and the held BSC number of 0. The second base station BTS2 sends, to the second call processing processor CLP1 in the base station control apparatus BSC, the second handover request signal with the held CLP number of 1 and the held BSC number of 0. The second call processing processor CLP1 in the base station control apparatus BSC sends a second handover acceptance signal to the second base station BTS2 with the CLP number and the BSC number attached to the second handover acceptance signal. The second base station BTS2 sends, to the second mobile station MS1, the second handover acceptance signal with the CLP number and the BSC number. The second mobile station MS2 stores or holds the CLP number and the BSC number as a held CLP number and a held BSC number.

Figure 17:
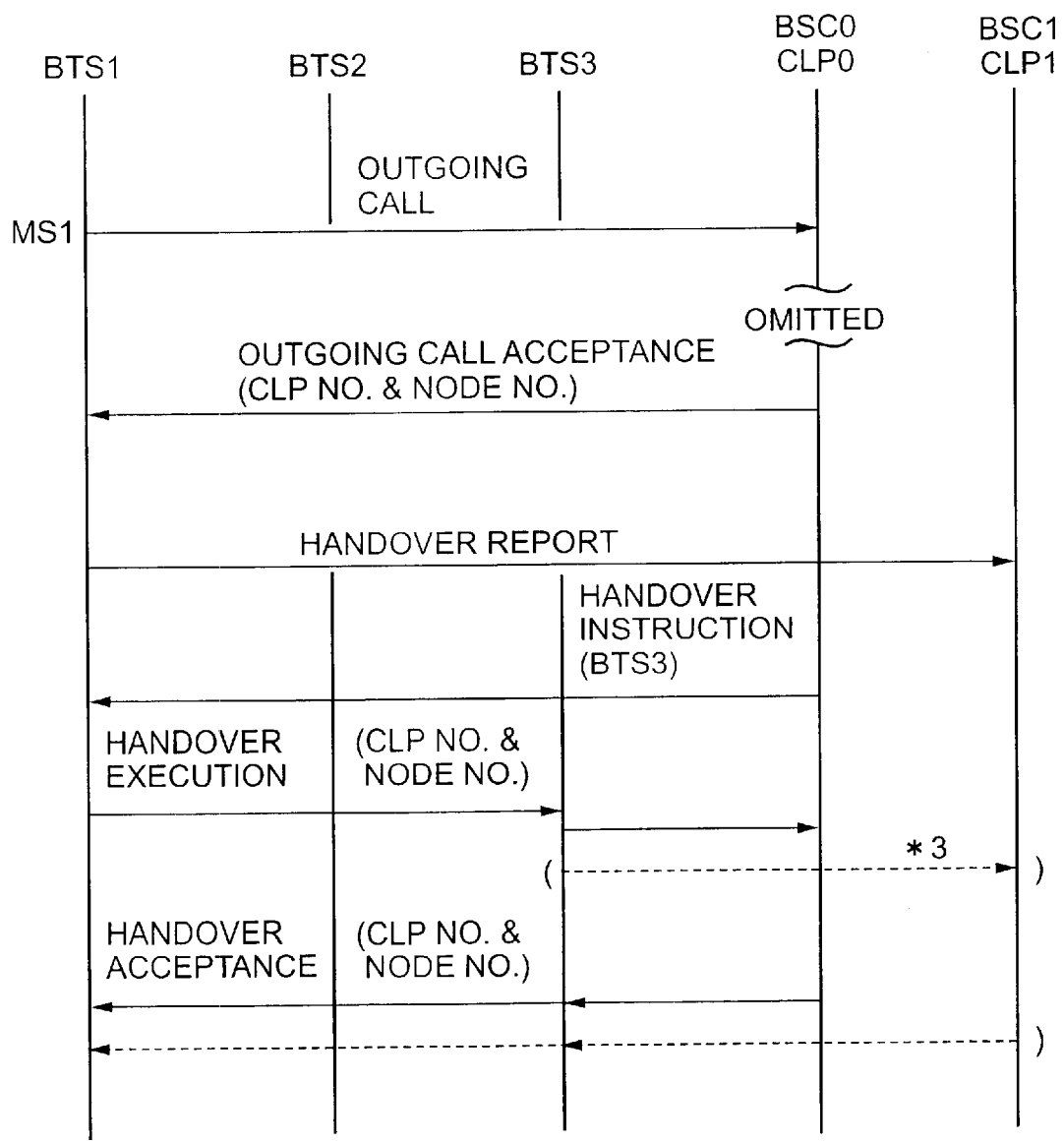
FIG. 17 is a sequence chart for use in describing operation on handover of a mobile station assist type.

FIG. 17 is a sequence diagram showing an operation example of the handover of a mobile station assist type in the mobile communication system illustrated in FIG. 8. The illustrated mobile communication system comprises a first mobile station MS1, first through third base stations BTS1, BTS2, and BTS3, and first and second base station control apparatuses BSC0 and BSC1 which include first and second call processing processors CLP0 and CLP2, respectively. The first and the second call processing processors CLP0 and CLP1 are assigned with the CLP numbers of 0 and 1, respectively. In addition, the first and the second base station control apparatuses BSC0 and BSC0 are assigned with node numbers of 0 and 1, respectively. The first through the third base stations BTS1 to BTS3 cover first through third cells, respectively.

It will be assumed that the first through the third base stations BTS1 to BTS3 are connected to the first base station control apparatus BSC0. In addition, it will be assumed that the first mobile station MS1 lies in the first cell. Under the circumstances, the first mobile station MS1 sends an incoming call signal to the first base station BTS1. The first base station BTS1 sends the incoming call signal to the first call processing processor CLP0 in the first base station control apparatus BSC0. The first call processing processor CLP0 in the first base station control apparatus BSC0 sends, to the first base station BTS1, an incoming call acceptance signal with the CLP number of 0 and the node number of 0. The first base station BTS1 sends the incoming call acceptance signal with the CLP number of 0 and the node number of 0 to the first mobile station MS1. The first mobile station MS1 stores or holds the CLP number of 0 and the node number of 0 as a held CLP number and a held node number. The first base station BTS1 sends, to the second call processing processor CLP1 in the second base station control apparatus BSC1, a handover report signal including a list of the base stations to be exchanged.

It will be presumed that the first mobile station MS1 moves from the first cell toward the third cell. In this event, the first call processing processor CLP0 in the first base station control apparatus BSC0 sends, to the first base station BTS1, a handover instruction signal indicative of the third base station BST3 to be exchanged. The first base station BTS1 sends the handover instruction signal to the first mobile station MS1. Responsive to the handover instruction signal, the first mobile station MS1 executes the handover and transmits, to the third base station BTS3, a handover execution signal with the held CLP number and the held node number. The third base station BTS3 sends the handover execution signal with the held CLP number and the held node number to the first call processing processor CLP0 in the first base station control apparatus BSC0. The first call processing processor CLP0 in the first base station control apparatus BSC0 sends, to the first mobile station MS1 via the third base station BTS3, a handover acceptance signal with the CLP number of 0 and the node number of 0.

It will be assumed that the first and the second base stations BTS1 and BTS2 are connected to the first base station control apparatus BSC0 while the third base station BTS3 is connected to the second base station control apparatus BSC1. In addition, it will be assumed that the first mobile station MS1 lies in the first cell. Under the circumstances, the first mobile station MS1 sends an incoming call signal to the first base station BTS1. The first base station BTS1 sends the incoming call signal to the first call processing processor CLP0 in the first base station control apparatus BSC0. The first call processing processor CLP0 in the first base station control apparatus BSC0 sends, to the first base station BTS1, an incoming call acceptance signal with the CLP number of 0 and the node number of 0. The first base station BTS1 sends the incoming call acceptance signal with the CLP number of 0 and the node number of 0 to the first mobile station MS1. The first mobile station MS1 stores or holds the CLP number of 0 and the node number of 0 as a held CLP number and a held node number. The first base station BTS1 sends, to the second call processing processor CLP1 in the second base station control apparatus BSC1, a handover report signal including a list of the base stations to be exchanged.

It will be presumed that the first mobile station MS1 moves from the first cell toward the third cell. In this event, the first call processing processor CLP0 in the first base station control apparatus BSC0 sends, to the first base station BTS1, a handover instruction signal indicative of the third base station BST3 to be exchanged. The first base station BTS1 sends the handover instruction signal to the first mobile station MS1. Responsive to the handover instruction signal, the first mobile station MS1 executes the handover and transmits, to the third base station BTS3, a handover execution signal with the held CLP number of 0 and the held node number of 0. The third base station BTS3 sends the handover execution signal with the held CLP number and the held node number to the second call processing processor CLP1 in the second base station control apparatus BSC1. The second call processing processor CLP1 in the second base station control apparatus BSC1 sends, to the first mobile station MS1 via the third base station BTS3, a handover acceptance signal with the CLP number of 1 and the node number of 1.

While this invention has thus far been described in conjunction with preferred embodiments thereof, it will now be readily possible for those skilled in the art to put this invention into various other manners.

What is claimed is:

1. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication method comprising the steps of:

establishing N call processing virtual connection links between each of said base stations and said exchange station;

controlling, in response to outgoing calls successively generated by said base stations, the call processing by said N call processing processors in order by changing said N call processing virtual connection links in order;

checking, in said exchange station, whether or not the call processing processor normally operates; and informing, in a case where there is any abnormality in the call processing processor, said base stations of disablement of the call processing processor in question via an operational maintenance virtual connection link.

2. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication system comprising a mobile station, said mobile communication method comprising the steps of:

establishing N call processing virtual connection links between each of said base stations and said exchange station;

controlling, in response to outgoing calls successively generated by said base stations, the call processing by said N call processing processors in order by changing said N call processing virtual connection links in order;

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

3. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication method comprising the steps of:

establishing N call processing virtual connection links between each of said base stations and said exchange station;

controlling, in response to outgoing calls successively generated by said base stations, the call processing by said N call processing processors in order by changing said N call processing virtual connection links in order;

sending, from said exchange station to said base stations via an operational maintenance virtual connection link, the number N of said call processing processors before establishing the N call processing virtual connection links; and after establishing a call processing virtual connection link with a particular base station, reporting an event of its establishment to the call processing processor corresponding to the call processing virtual connection link in question, thereby making possible communication between said particular base station and the call processing processor in question.

4. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication method comprising the steps of:

establishing N call processing virtual connection links between each of said base stations and said exchange station; and controlling, in response to outgoing calls successively generated by said base stations, the call processing by said N call processing processors in order by changing said N call processing virtual connection links in order;

sending, from said exchange station to said base stations via an operational maintenance virtual connection link, the number N of said call processing processors before establishing the N call processing virtual connection links;

checking, in said exchange station whether or not the call processing processor normally operates; and informing, in a case where there is any abnormality in the call processing processor, said base stations of disablement of the call processing processor in question via said operational maintenance virtual connection link.

5. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication system comprising a mobile station, said mobile communication method comprising the steps of:

establishing N call processing virtual connection links between each of said base stations and said exchange station;

controlling, in response to outgoing calls successively generated by said base stations, the call processing by said N call processing processors in order by changing said N call processing virtual connection links in order;

sending, from said exchange station to said base stations via an operational maintenance virtual connection link, the number N of said call processing processors before establishing the N call processing virtual connection links;

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

6. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication method comprising the steps of:

establishing N call processing virtual connection links between each of said base stations and said exchange station;

controlling, in response to outgoing calls successively generated by said base stations, the call processing by said N call processing processors in order by changing said N call processing virtual connection links in order;

sending, from said exchange station to said base stations via an operational maintenance virtual connection link, the number N of said call processing processors before establishing the N call processing virtual connection links;

after establishing a call processing virtual connection link with a particular base station, reporting an event of its establishment to the call processing processor corresponding to the call processing virtual connection link in question, thereby making possible communication between said particular base station and the call processing processor in question;

checking, in said exchange station, whether or not the call processing processor normally operates; and informing, in a case where there is any abnormality in the call processing processor, said base stations of disablement of the call processing processor in question via an operational maintenance virtual connection link.

7. A mobile communication method for use in a mobile communication system for carrying out transmission between a plurality of base stations and an exchange station using an asynchronous transfer mode (ATM), said exchange station including N call processing processors where N represents a positive integer which is not less than two, said mobile communication system comprising a mobile station, said mobile communication method further comprising the steps of:

establishing N call processing virtual connection links between each of said base stations and said exchange station;

controlling, in response to outgoing calls successively generated by said base stations, the call processing by said N call processing processors in order by changing said N call processing virtual connection links in order;

sending, from said exchange station to said base stations via an operational maintenance virtual connection link, the number N of said call processing processors before establishing the N call processing virtual connection links;

after establishing a call processing virtual connection link with a particular base station, reporting an event of its establishment to the call processing processor corresponding to the call processing virtual connection link in question, thereby making possible communication between said particular base station and the call processing processor in question;

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

8. A mobile communication method as claimed in claim 1, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in new base station, a call processing virtual connection link in accordance with the identification number.

9. A mobile communication method as claimed in claim 3, further comprising the steps of:

checking, in said exchange station, whether or not the call processing processor normally operates; and informing, in a case where there is any abnormality in the call processing processor, said base stations of disablement of the call processing processor in question via said operational maintenance virtual connection link.

10. A mobile communication method as claimed in claim 3, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

11. A mobile communication method as claimed in claim 4, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

12. A mobile communication method as claimed in claim 6, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

13. A mobile communication method as claimed in claim 9, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

14. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

checking, in said base station control apparatus, whether or not the call processing processor normally operates; and informing, in a case where there is any abnormality in the call processing processor, said base stations of disablement of the call processing processor in question via an operational maintenance virtual connection link.

15. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication system comprising a mobile station, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

16. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

sending, from said base station control apparatus to said base stations via an operational maintenance virtual connection link, the number N of said call processing processors before establishing the N call processing virtual connection links;

after establishing a call processing virtual connection link with a particular base station, reporting an event of its establishment to the call processing processor corresponding to the call processing virtual connection link in question, thereby making possible communication between said particular base station and the call processing processor in question.

17. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

sending, from said base station control apparatus to said base stations via an operational maintenance virtual connection link, the number N of said call processing processors before establishing the N call processing virtual connection links;

checking, in said base station control apparatus, whether or not the call processing processor normally operates; and informing, in a case where there is any abnormality in the call processing processor, said base stations of disablement of the call processing processor in question via said operational maintenance virtual connection link.

18. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication system comprising a mobile station, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

sending, from said base station control apparatus to said base stations via an operational maintenance virtual connection link, the number N of said call processing processors before establishing the N call processing virtual connection links;

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

19. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

sending, from said base station control apparatus to said base stations via an operational maintenance virtual connection link, the number N of said call processing processors before establishing the N call processing virtual connection links;

after establishing a call processing virtual connection link with a particular base station, reporting an event of its establishment to the call processing processor corresponding to the call processing virtual connection link in question, thereby making possible communication between said particular base station and the call processing processor in question;

checking, in said base station control apparatus, whether or not the call processing processor normally operates; and informing, in a case where there is any abnormality in the call processing processor, said base stations of disablement of the call processing processor in question via an operational maintenance virtual connection link.

20. A mobile communication method for use in a mobile communication system for carrying out transmission between a plurality of base stations and a base station control apparatus using an asynchronous transfer mode (ATM), said base station control apparatus including N call processing processors where N represents a positive integer which is not less than two, said mobile communication system comprising a mobile station, said mobile communication method comprising the steps of:

establishing N call processing virtual connection links between each of said base stations and said base station control apparatus;

controlling, in response to outgoing calls successively generated by said base stations, the call processing by said N call processing processors in order by changing said N call processing virtual connection links in order;

sending, from said base station control apparatus to said base stations via an operational maintenance virtual connection link, the number N of said call processing processors before establishing the N call processing virtual connection links;

after establishing a call processing virtual connection link with a particular base station, reporting an event of its establishment to the call processing processor corresponding to the call processing virtual connection link in question, thereby making possible communication between said particular base station and the call processing processor in question;

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

21. A mobile communication method as claimed in claim 14, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

22. A mobile communication method as claimed in claim 16, further comprising the steps of:

checking, in said base station control apparatus, whether or not the call processing processor normally operates; and informing, in a case where there is any abnormality in the call processing processor, said base stations of disablement of the call processing processor in question via said operational maintenance virtual connection link.

23. A mobile communication method as claimed in claim 16, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

24. A mobile communication method as claimed in claim 17, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

25. A mobile communication method as claimed in claim 19, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

26. A mobile communication method as claimed in claim 22, said mobile communication system comprising a mobile station, said mobile communication method further comprising the steps of:

informing, in a particular base station, said mobile station of an identification number of the call processing processor for use in said mobile station in question;

informing, in said mobile station, a new base station of the identification number on handover; and selecting, in said new base station, a call processing virtual connection link in accordance with the identification number.

27. A mobile communication method for use in a mobile communication system comprising a mobile station, a plurality of base stations, and an exchange station connected to said base stations, said exchange station comprising N call processing processors where N represents a positive integer which is not less than two, said mobile communication method comprising the steps of:

informing, on reception of an outgoing call for said mobile station, said mobile station of an node number for identifying said exchange station actually connected to said mobile station via a particular base station and a processor number for identifying the call processing processor actually carrying out a call processing to make said mobile station hold the node number and the processor number as a held node number and a held processor number;

sending, when said mobile station carries out handover, the held node number and the held processor number from said mobile station to a new base station destined for the handover; and selecting, in said exchange station managing said new base station, the call processing processor in accordance with load distribution order to make said call processing processor inherit a call processing.

28. A mobile communication method as claimed in claim 27, further comprising the steps of:

establishing, between said base stations and said exchange station, N call processing virtual connection links for asynchronous transfer mode (ATM); and controlling, in response to outgoing calls successively generated by said base stations, the call processing by said N call processing processors in order by changing said N call processing virtual connection links in order.

29. A mobile communication method for use in a mobile communication system comprising a mobile station, a plurality of base stations, a base station control apparatus, for controlling said base stations, and an exchange station connected to said base station control apparatus, said base station control apparatus comprising N call processing processors where N represents a positive integer which is not less than two, said mobile communication method comprising the steps of:

informing, on reception of an outgoing call for said mobile station, said mobile station of a node number for identifying said base station control apparatus actually connected to said mobile station via a particular base station and a processor number for identifying the call processing processor actually carrying out a call processing to make said mobile station hold the node number and the processor number as a held node number and a held processor number;

sending, when said mobile station carries out handover, the held node number and the held processor number from said mobile station to a new base station destined for the handover; and selecting, in said base station control apparatus managing said new base station, the call processing processor in accordance with load distribution order to make said call processing processor inherit a call processing.

30. A mobile communication method as claimed in claim 29, further comprising the steps of:

establishing, between said base stations and said base station control apparatus, N call processing virtual connection links for asynchronous transfer mode (ATM); and controlling, in response to outgoing calls successively generated by said base stations, the call processing by said N call processing processors in order by changing said N call processing virtual connection links in order.

31. In a mobile communication system for carrying out transmission between a plurality of base stations and an exchange station using an asynchronous transfer mode (ATM), said exchange station comprising:

a plurality of primary ATM interfaces for carrying out connection of said base stations and another node;

an ATM switch;

N call processing processors for carrying out call control processing, where N represents a positive integer which is not less than two;

a common signaling processing processor for carrying out communication control between said other node and said exchange station;

an operational maintenance processor for managing said N call processing processors and said common signaling processing processor and for carrying out a path setting control for said ATM switch; and a plurality of primary base station control signal terminating equipments, disposed between said ATM switch and respective ones of said N call processing processors, said common signaling processing processor, and said operational maintenance processor, for setting links between each of said base stations and said other node and said exchange station, each of said base stations comprising:

a radio interface section for radio communication between said mobile station and the base station in question;

a secondary base station control signal terminating equipment for establishing an operational maintenance virtual connection link between said operational maintenance processor and said secondary base station control signal terminating equipment and N call processing virtual connection links between said N call processing processors and said secondary base station control signal terminating equipment;

a central processing unit for controlling said radio interface section and said secondary base station control signal terminating equipment to select the call processing virtual connection link in order in response to an outgoing call;

a secondary ATM interface for carrying out connection between said exchange station and the base station in question; and a multiplexing and demultiplexing unit for multiplexing and demultiplexing signals between said secondary ATM interface and said radio interface section and said secondary base station control signal terminating equipment.

32. A mobile communication system as claimed in claim 31, wherein said operational maintenance processor informs each of said base stations of the number N of the call processing processors via the operational maintenance virtual connection link, said secondary base station control signal terminating equipment establishing the call processing virtual connection links which are equal in number to the informed number N.

33. A mobile communication system as claimed in claim 31, wherein, after establishing a call processing virtual connection link with a particular base station, said secondary base station control signal terminating equipment in said particular base station reports an event of its establishment to the call processing processor corresponding to the call processing virtual connection link in question, said call processing processor receiving the event to make possible communication between said particular base station and the call processing processor in question.

34. A mobile communication system as claimed in claim 31, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

35. A mobile communication system as claimed in claim 31, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

36. A mobile communication system as claimed in claim 31, wherein, after establishing a call processing virtual connection link with a particular base station, said secondary base station control signal terminating equipment in said particular base station reports an event of its establishment to the call processing processor corresponding to the call processing virtual connection link in question, said call processing processor receiving the event to make possible communication between said particular base station and the call processing processor in question.

37. A mobile communication system as claimed in claim 32, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

38. A mobile communication system as claimed in claim 32, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

39. A mobile communication system as claimed in claim 33, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

40. A mobile communication system as claimed in claim 33, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, the call processing virtual connection link established in said secondary base station control signal terminating equipment.

41. A mobile communication system as claimed in claim 34, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, the call processing virtual connection link established in said secondary base station control signal terminating equipment.

42. A mobile communication system as claimed in claim 36, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

43. A mobile communication system as claimed in claim 36, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

44. A mobile communication system as claimed in claim 37, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, the call processing virtual connection link established in said secondary base station control signal terminating equipment.

45. A mobile communication system as claimed in claim 39, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

46. A mobile communication system as claimed in claim 42, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

47. In a mobile communication system for carrying out transmission between a plurality of base stations and a base station control apparatus using an asynchronous transfer mode (ATM), said base station control apparatus comprising:

a plurality of primary ATM interfaces for carrying out connection of said base stations and another node;

an ATM switch;

N call processing processors for carrying out call control processing, where N represents a positive integer which is not less than two;

a common signaling processing processor for carrying out communication control between said another node and said base station control apparatus;

an operational maintenance processor for managing said N call processing processors and said common signaling processing processor and for carrying out a path setting control for said ATM switch; and primary base station control signal terminating equipments, disposed between said ATM switch and respective ones of said N call processing processors, said common signaling processing processor, and said operational maintenance processor, for setting links between each of said base stations and said other node and said base station control apparatus, each of said base stations comprising:

a radio interface section for radio communication between said mobile station and the base station in question;

a secondary base station control signal terminating equipment for establishing an operational maintenance virtual connection link between said operational maintenance processor and said secondary base station control signal terminating equipment and call processing virtual connection links between said N call processing processors and said secondary base station control signal terminating equipment;

a central processing unit for controlling said radio interface section and said secondary base station control signal terminating equipment to select the call processing virtual connection link in order in response to an outgoing call;

a secondary ATM interface for carrying out connection between said exchange station and the base station in question; and a multiplexing and demultiplexing unit for multiplexing and demultiplexing signals between said secondary ATM interface and said radio interface section and said secondary base station control signal terminating equipment.

48. A mobile communication system as claimed in claim 47, wherein said operational maintenance processor informs each of said base stations of the number N of the call processing processors via the operational maintenance virtual connection link, said secondary base station control signal terminating equipment establishing the call processing virtual connection links which are equal in number to the informed number N.

49. A mobile communication system as claimed in claim 47, wherein, after establishing a call processing virtual connection link with a particular base station, said secondary base station control signal terminating equipment reports an event of its establishment to the call processing processor corresponding to the call processing virtual connection link in question, said call processing processor receiving the event to make possible communication between said particular base station and the call processing processor in question.

50. A mobile communication system as claimed in claim 47, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

51. A mobile communication system as claimed in claim 47, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, the call processing virtual connection link established in said secondary base station control signal terminating equipment.

52. A mobile communication system as claimed in claim 48, wherein, after establishing a call processing virtual connection link with a particular base station, said secondary base station control signal terminating equipment reports an event of its establishment to the call processing processor corresponding to the call processing virtual connection link in question, said call processing processor receiving the event to make possible communication between said particular base station and the call processing processor in question.

53. A mobile communication system as claimed in claim 48, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

54. A mobile communication system as claimed in claim 48, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

55. A mobile communication system as claimed in claim 49, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

56. A mobile communication system as claimed in claim 49, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

57. A mobile communication system as claimed in claim 50, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

58. A mobile communication system as claimed in claim 52, wherein said operational maintenance processor checks whether or not the call processing processor normally operates, said operational maintenance processor reports said base stations of disablement of the call processing processor in question via the operational maintenance virtual connection link in a case where there is any abnormality in the call processing processor.

59. A mobile communication system as claimed in claim 52, wherein said central processing unit of each of said base stations informs, via the radio interface section said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

60. A mobile communication system as claimed in claim 53, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

61. A mobile communication system as claimed in claim 55, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

62. A mobile communication system as claimed in claim 58, wherein said central processing unit of each of said base stations informs, via the radio interface section, said mobile station of an identification number of the call processing processor for use in said mobile station in question, when receiving an identification number of said call processing processor on handover, said central processing unit of each of said base stations selects, in accordance with the informed identification number, a call processing virtual connection link established in said secondary base station control signal terminating equipment.

* * * * *